United States Patent [19]

Watanabe et al.

[11] Patent Number: 4,794,553

[45] Date of Patent: Dec. 27, 1988

[54] COMPACT ELECTRONIC CALCULATOR HAVING GRAPH DISPLAY FUNCTION

[75] Inventors: Kazuyoshi Watanabe; Hiroyuki Yoshino; Junichi Maeda; Osamu Negishi, all of Tokyo, Japan

[73] Assignee: Casio Computer Co., Ltd., Tokyo, Japan

[21] Appl. No.: 861,340

[22] Filed: May 9, 1986

[30] Foreign Application Priority Data

May 24, 1985 [JP] Japan ................................ 60-110134

[51] Int. Cl.$^4$ .......................... G06F 15/66; G06F 3/14
[52] U.S. Cl. ................................ 364/710.01; 364/521
[58] Field of Search ................................ 364/710, 521

[56] References Cited

U.S. PATENT DOCUMENTS 4,184,202  1/1980  McCrae .......................... 364/710 X
4,535,416  8/1985  Kano et al. ...................... 364/710 X
4,566,072  1/1986  Mortensen et al. .............. 364/710 X
4,701,962  7/1978  Hakata ............................. 364/710 X Primary Examiner—David H. Malzahn
Attorney, Agent, or Firm—Frishauf, Holtz, Goodman & Woodward

[57] ABSTRACT

A compact electronic calculator having a graph display function of the invention has function keys for inputting functional formulas, a memory for storing an input functional formula, range input keys for inputting range data for variables in the formula, a memory for storing the range data, and a read-only memory (ROM) for storing a control program which sequentially calculates the values of the dependent variable for the independent variable with an ALU in accordance with the functional formula and the range data and which displays the calculated values on a display component.

10 Claims, 29 Drawing Sheets

```
Range
xmin : -180.
  max :  180.
  scl :   90.
Ymin :  -2.
  max :   2.
  scl :   0.5
```

FIG. 22A
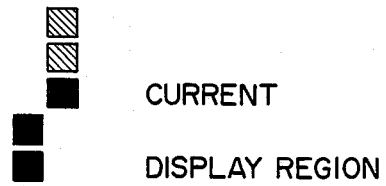
  DISPLAY REGION

F I G. 25A  Y=sinx
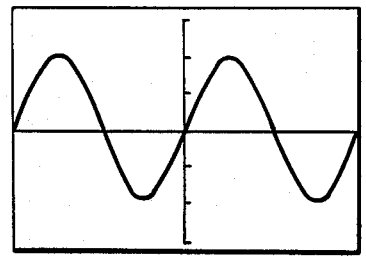
Xmin=-360
max= 360
Ymin=-1.6
max= 1.6
F I G. 25B  Y=cosx
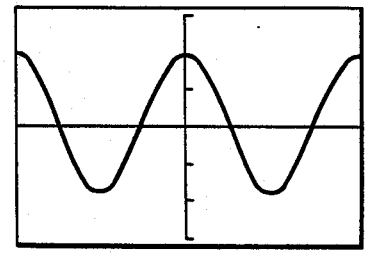
Xmin=-360
max= 360
Ymin=-1.6
max= 1.6
F I G. 25C  Y=tanx
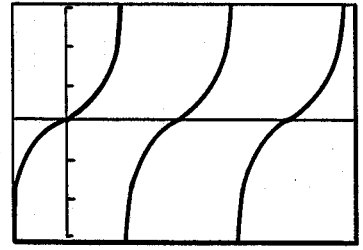
Xmin=-90
max= 455.806
Ymin=-6
max= 6

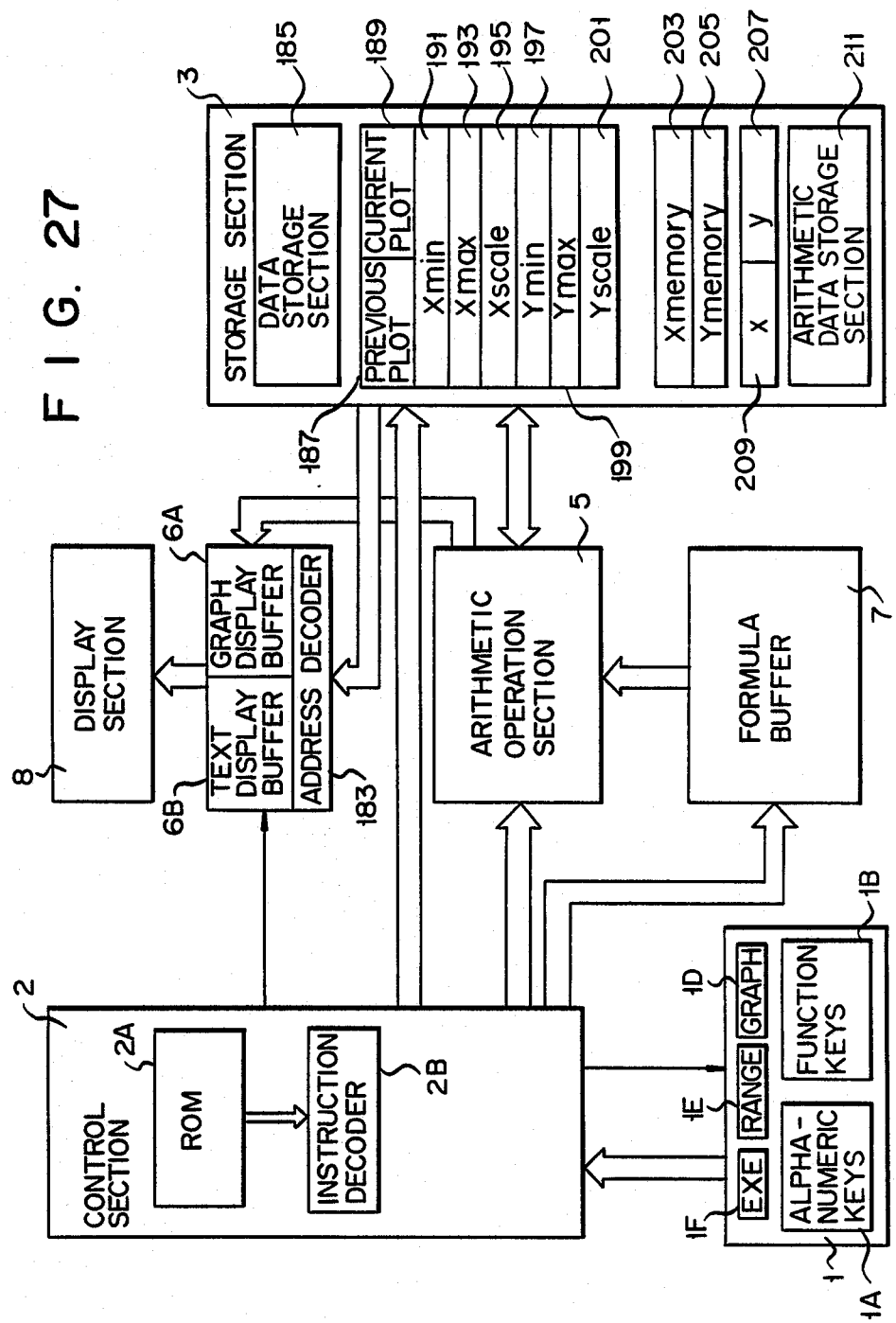
F I G. 27

F I G. 29
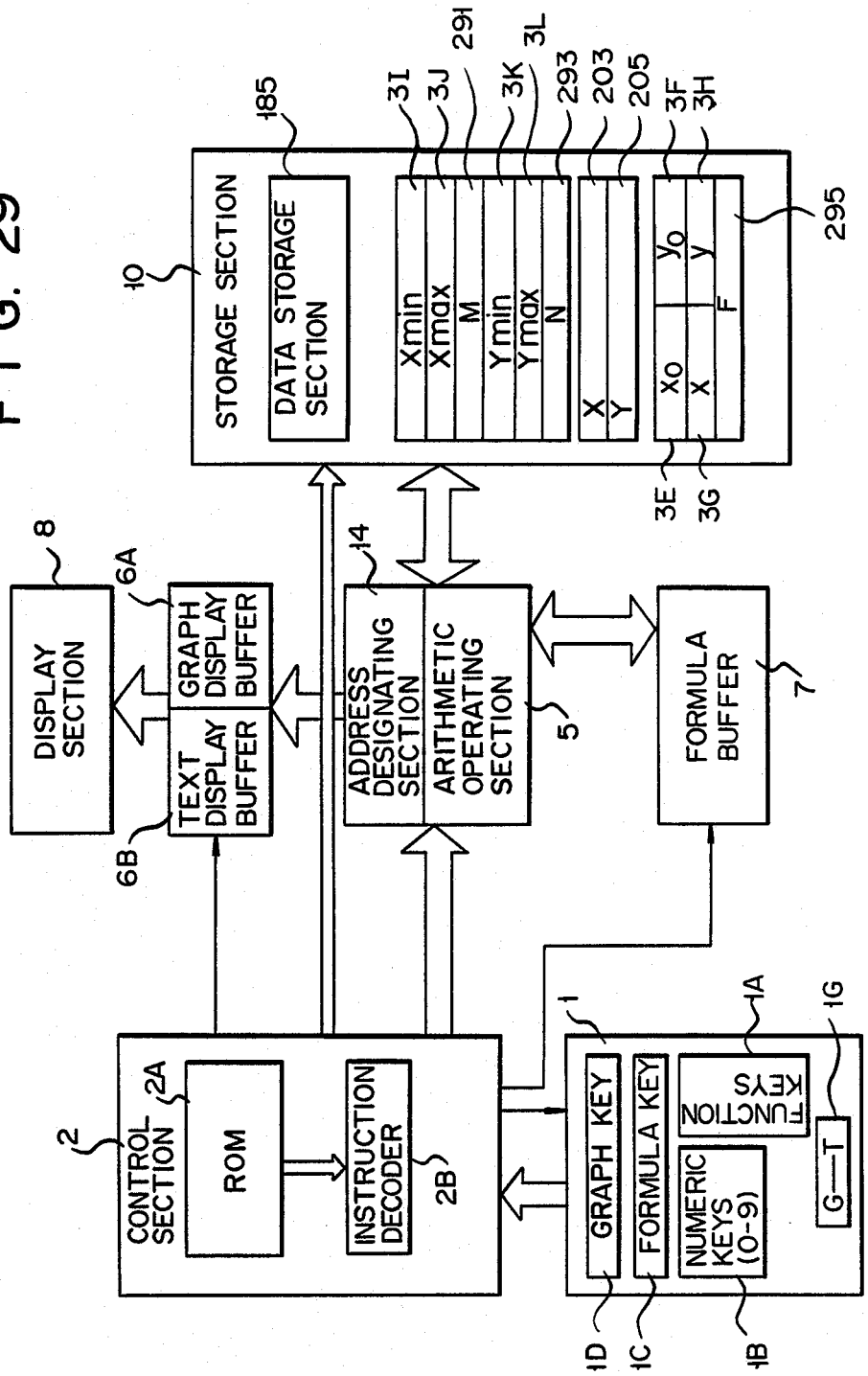

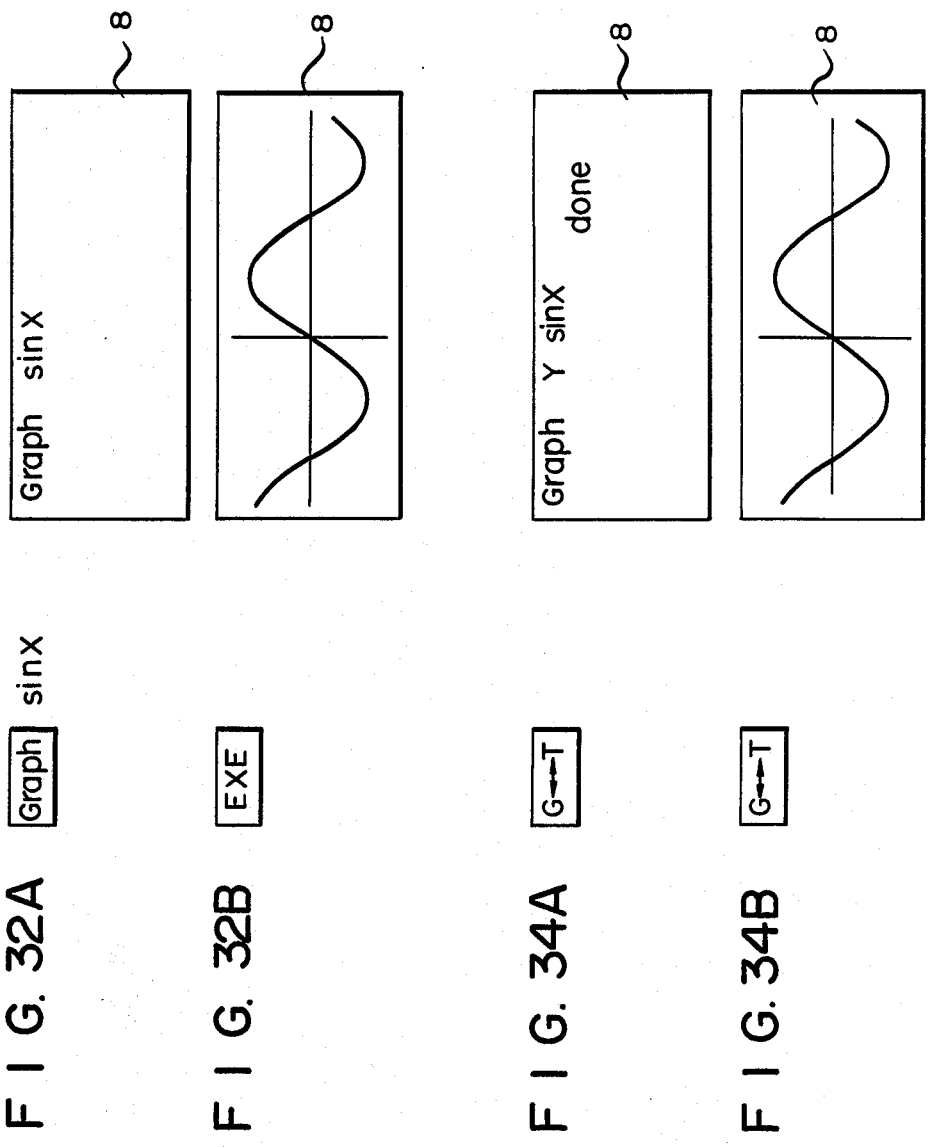

COMPACT ELECTRONIC CALCULATOR HAVING GRAPH DISPLAY FUNCTION

BACKGROUND OF THE INVENTION

The present invention relates to a compact electronic calculator having a graph display function for displaying a graph of any functional formula.

A conventional compact electronic calculator is known which can display the graph of a functional formula. In an electronic calculator of this type, a given functional formula $y=f(x)$ is keyed in and the value of dependent variable y is calculated for each value of independent variable x.

More specifically, when independent variable x is changed in units of 0.5 within a range of 0 to 10, independent variable x and formula f(x) must be input twenty times each, which is a very cumbersome operation.

Conventional electronic calculators can only display graphs of formulas at the display section. Since the coordinate axes are not displayed, it is difficult to determine the number of roots and their values.

In addition, coordinates which fall outside the display region for variables x and y are not connected with lines. Therefore, graph portions at the boundary of the display region become discrete and do not provide a complete graph, this resulting in an incomplete visual display.

In a conventional general function electronic calculator, only numerical information can be processed. If a visual graph image is desired for even a simple function such as a sine function, numerical information must be manually plotted on graph paper.

With computers some graph displays can be obtained with programs. However, a computer must have a programming capability to provide this function. Even if this function is provided, various complex input procedures are required including setting of a display range or coordinates.

In a conventional computer having a graph display function, a program for drawing a graph can be created with a personal computer or the like, and data is input to allow a display unit to display a graph.

However, in this case, a special graph program must be created by the operator.

Since only one display buffer is conventionally used for the display screen, when a graph formula or a comment is to be added to the graph, it is inserted in the graph image. This results in overlapping of the characters and graph and poor readability.

SUMMARY OF THE INVENTION

It is an object of the present invention to provide an improved compact electronic calculator which is free from the above drawbacks of conventional electronic calculators and which has a graph display function.

In a compact electronic calculator having a graph display function according to the present invention, a desired functional formula is input and range data for each variable in the formula is input to automatically perform functional operation. The obtained graph is displayed on a matrix display. Therefore, unlike in the conventional electronic calculator described above, data for respective coordinate points of a functional formula need not be input, and a graph can be automatically displayed with a simplified key input.

According to the present invention, the coordinate axes (X- and Y-axes) and their scales are calculated in accordance with preset functional variables. When the scales fall outside the display region of the screen, the graph is displayed with scales at the edges (sides) of the display screen which are closer to the corresponding axes. With this arrangement, even if the coordinate axes cannot be displayed, the scales are displayed and the graph can be viewed with ease.

According to the present invention, when graph display data is automatically obtained by operation of the range data for each variable and a functional formula, the question of whether to connect the previous coordinate point and the current coordinate point with a line is determined in accordance with the positional relationship of the two points. Therefore, the graph is always displayed to the boundary of the display region, providing a graph which is easy to look at.

The electronic calculator of the present invention further has a fixed range storage for storing the range of each variable in a preset functional formula. When a function display instruction is given through a key input section, the fixed range of the function is retrieved from the fixed range storage and supplied to a range storage. X and Y are calculated in accordance with the range data, and the calculated result is stored in the X- and Y-memories of the storage. The display addresses for the variables on the display are designated by an address designation section in accordance with the values in the X- and Y-memories. The points corresponding to the addresses determined in this manner are lit up to display the graph. In this manner, the graph of a preset functional formula can be displayed with only a small memory capacity.

According to the present invention, when one or more sets of graph display data are supplied, one set of data already preset in the display storage is not cleared. Instead, the next set of data is written overlapping it. Therefore a plurality of graphs can be displayed on the screen at the same time. It is often necessary to display a plurality of graphs when the area of a region bound by two graphs is calculated by integration or when the difference between groups of experimental and theoretical data is sought. In such a case, the graph already registered in storage need not be cleared to input another set of graph data.

The electronic calculator according to the present invention has a memory for storing graph data, a memory for storing character display data corresponding to the graph data, means for selecting the contents of one of the memories, and a display means for displaying the contents of the selected memory. With this electronic calculator, correspondence between a graphic representation and a character display of a calculation or functional formula can be immediately recognized.

In order to achieve the above object of the present invention, there is provided a compact electronic calculator having a graphic display function, comprising:

input means for inputting a functional formula;

storage means for storing the functional formula;

range input means for inputting range data representing ranges of variables;

range data storage means for storing the range data;

operation means for sequentially calculating a value of a dependent variable for an independent variable based on the functional formula and the range data; and display control means for allowing a display section to display the graph of the functional formula on the basis of the independent and dependent variable values calculated by the operation means.

BRIEF DESCRIPTION OF THE DRAWINGS

Other objects and features of the present invention will be apparent from the following description taken in connection with the accompanying drawings, in which:

FIGS. 22A and 22B show cases wherein lines between the current and previous coordinate points are displayed and not displayed;

FIGS. 25A through 25C show an example of a graphic display of a preset functional formula by an apparatus of the embodiment in FIG. 23;

FIG. 27 is a block diagram showing still another embodiment of the present invention;

FIG. 29 is a block diagram showing still another embodiment of the present invention;

FIGS. 32A and 32B show examples of graph display of a function and character display in the embodiment shown in FIG. 29;

FIGS. 34A and 34B show the changing of displays by depression of switch key 1G;

DETAILED DESCRIPTION OF THE PREFERRED EMBODIMENTS

Figure 1:
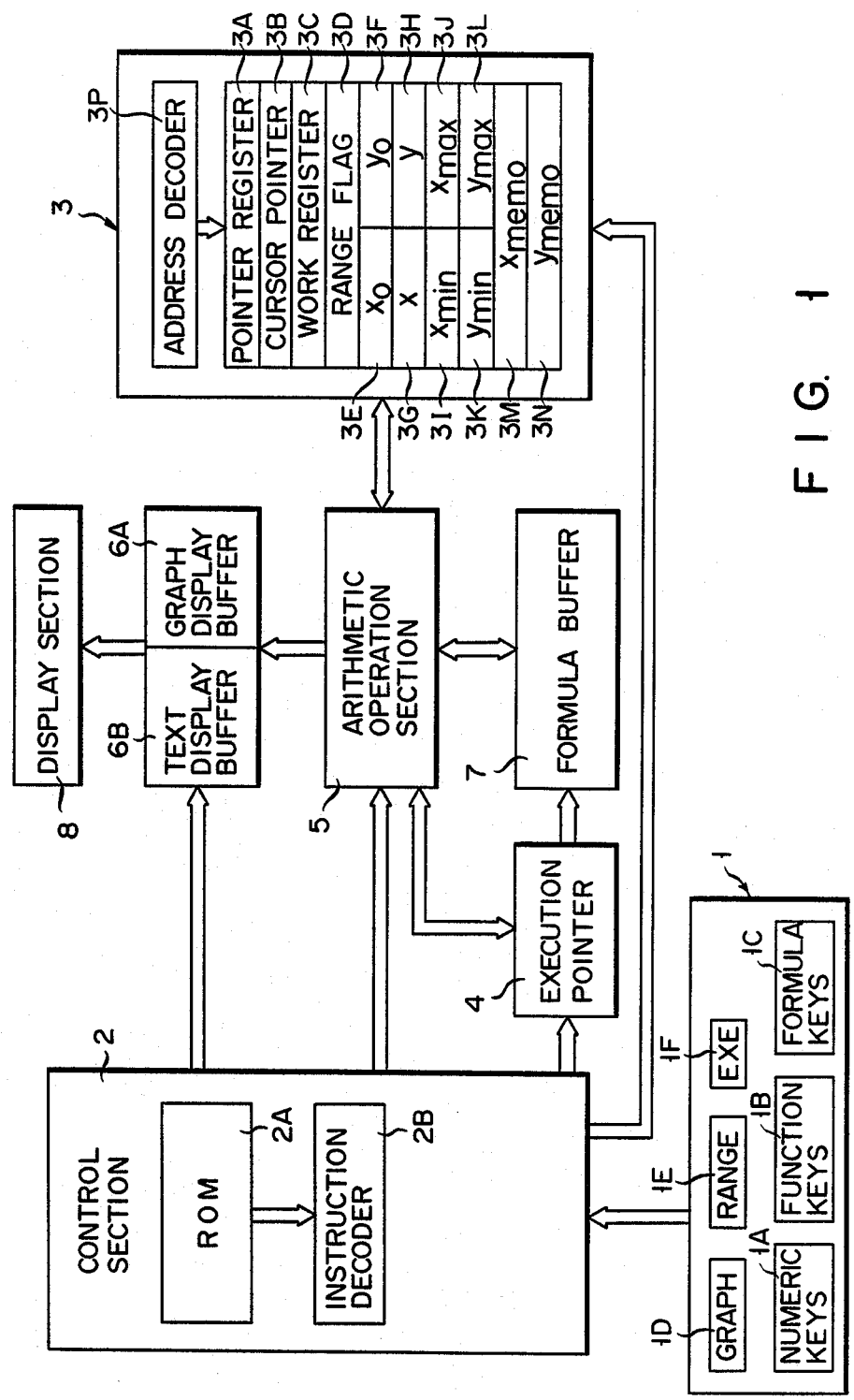
FIG. 1 is a block diagram showing an embodiment of the present invention.

FIG. 1 shows a circuit diagram of a compact electronic calculator having a graph display function according to an embodiment of the present invention. Key input section 1 has keys which are normally included in a conventional electronic calculator: numeric keys (0–9) 1A, function keys (+, −, x, ÷) 1B, formula keys 1C inputting the formula of a function, graph key 1D designating the functional graph display mode, range key 1E designating the input mode for range data for independent and dependent variables x and y included in the functional formula, and EXE (execution) key 1F designating execution of function calculation. A signal from section 1 is supplied to control section 2.

Control section 2 supplies various control signals to read only memory (ROM) 2A (which stores a program controlling the overall electronic calculator), storage section 3 (which decodes instructions from ROM 2A), execution pointer 4, arithmetic operation section 5, and display buffers 6A and 6B. Storage section 3 consists of random access memories (RAM) 3A through 3N and address decoder 3P. Random access memories include pointer register 3A temporarily saving the execution pointer set in execution pointer 4 by control section 2 when calculation of a function is performed; cursor pointer 3B; work register 3C; range register 3D storing a range input mode flag; x0 and y0 registers 3E and 3F setting the previous coordinates x0 and y0 for graph display when function calculation is performed; x and y registers 3G and 3H setting the current coordinates x and y; xmin and xmax register 3I and 3J setting the minimum and maximum values defining a range of variable x; ymin and ymax register 3K and 3L setting the minimum and maximum values of variable y; and xmemo and ymemo registers 3M and 3N writing actual values of a coordinate point (x, y) for graph display.

Functional formula data input from section 1 is written at respective addresses of formula buffer 7 which are accessed by execution pointer 4. The data is subsequently fetched by section 5.

Section 5, under the control of section 2, performs calculation of the functional formula output from formula buffer 7 using registers 3A through 3N of storage section 3. Section 5 reads out data for graph display therefrom and supplies the data to graph display buffer 6A in buffer 6. When normal numeric display or the like is performed, corresponding data is supplied to text display buffer 6B. The display data supplied to buffers 6A and 6B is supplied to display section 8 and used for displaying graphs, numerical values, or the like.

Section 8 comprises, e.g., a liquid crystal display device and has 96 dots (dot display points or coordinate points) in the X direction and 64 dots in the Y direction for data display.

The operation of this embodiment will be described with reference to FIGS. 2 through 6 for the case wherein a functional formula $$y = \sin(x+2) \quad (1)$$

is calculated and the result is displayed as a graph.

Control section 2 presets the minimum and maximum values defining a range for independent variable x in xmin register 3I and xmax register 3J. Similarly, section 2 presets the minimum and maximum values of a range for dependent variable y in ymin register 3K and ymax register 3L.

Figure 2:
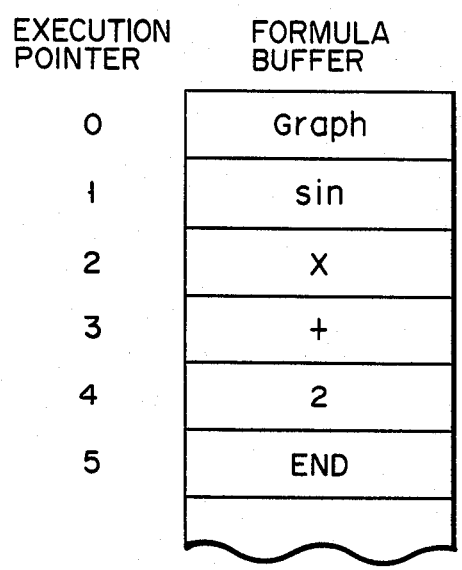
FIG. 2 shows data stored in a formula buffer in the embodiment shown in FIG. 1.

Subsequently, formula (1) above is input using graph key 1D, formula keys 1C, function keys 1B, numeric keys 1A, and EXE key 1F. The input data is stored in formula buffer 7. More specifically, control section 2 controls execution pointer 4 to sequentially generate addresses 0 through 5 for buffer 7. As a result, data is set as shown in FIG. 2. "END" in pointer address 5 is END code data written when EXE key 1F is depressed. Sections 2 and 5 perform function calculation of formula (1) and display the calculation result at display section 8 in accordance with the flow charts shown in FIGS. 4 through 6.

Figure 4:
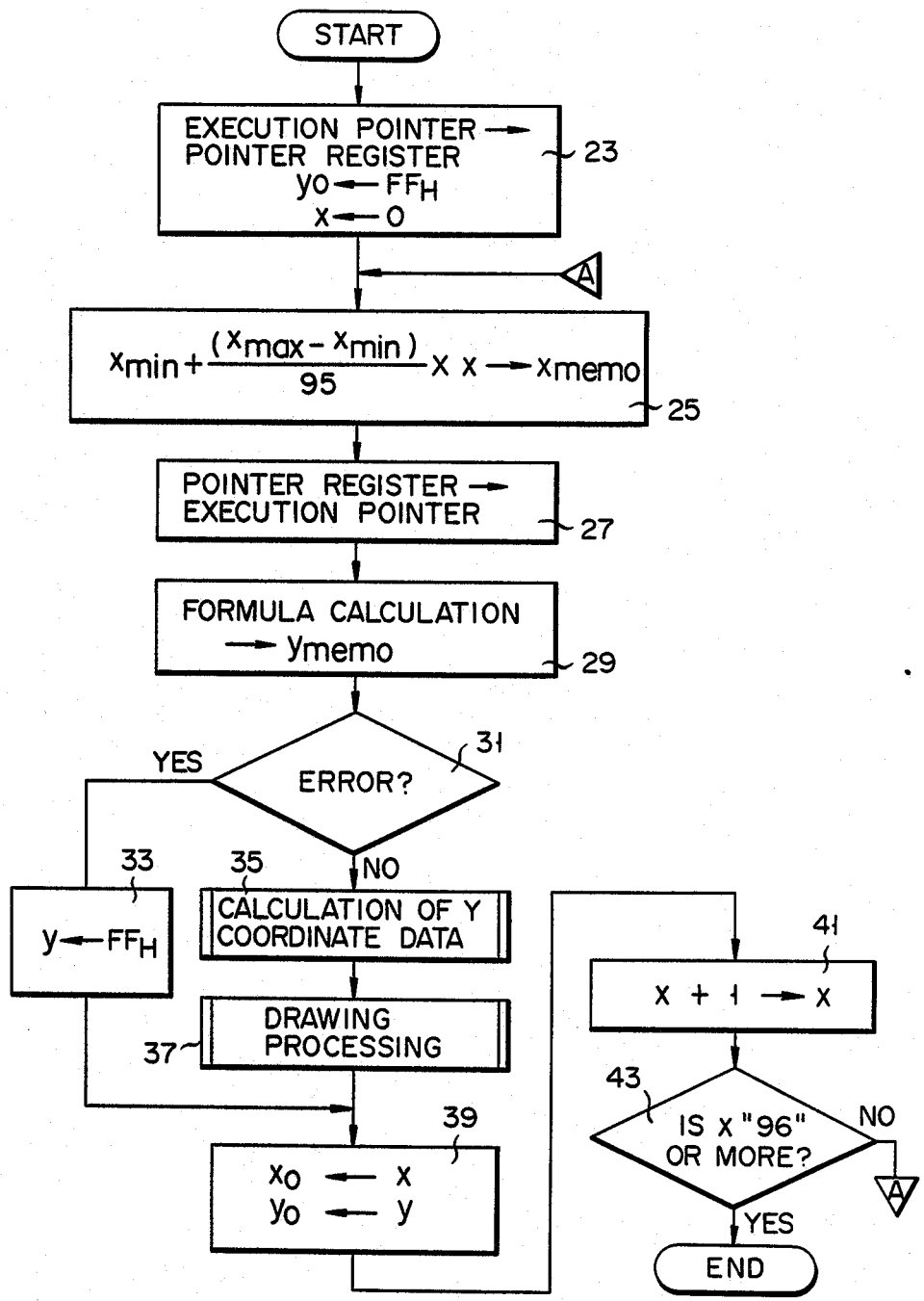
FIGS. 4 through 6 are flow charts performing calculation and display of a functional formula stored in the formula buffer.

In step 23 is FIG. 4, the start pointer (address "0") of pointer 4 is saved in pointer register 3A, data 37 FF" (hexadecimal code) is written in y0 register 3F, and x register 3G is cleared.

In step 25, xmin+(xmax−xmin)x/95 is calculated using the range data set in register 3I and 3J and the preset value ("0") in x register 3G. Then, data representing the actual value of independent variable x when the x-coordinate is "0", i.e., data preset in register 3I is obtained and set in xmemo register 3M. The value in xmemo register 3M represents the actual value at coordinate x=0 of the first display dot in the X direction.

In step 27, address "0" saved in pointer register 3A is supplied to execution pointer 4. Pointer 4 sequentially supplies addresses 0 through 5 to formula buffer 7. Thus, data is sequentially read out from addresses 0 through 5 of buffer 7 and fetched by operation section 5. In step 29, function calculation of formula (1) is performed, and the first solution is set in ymemo register 3N. In step 31, it is checked if the first solution is an operation error (overflow, underflow, or the like). If an error is detected in step 31, a hexadecimal code "FF" representing error data is written in y register 3H in step 33, and control advances to step 39.

However, if no error is detected in step 31, y coordinate data calculation subroutine 35 and line drawings processing subroutine 37 are performed. More specifically, control section 2 supplies data for y-coordinate calculation (calculation for the coordinates of the first display dot in the Y direction) and the display data for the first coordinate point (x, y) to buffer 6A, and causes display section 8 to display it.

In step 39, control section 2 transfers the current calculation data from register 3G to register 3E (to be used as the previous calculation data in the next calculation processing). Similarly, the current calculation data is transferred from y register 3H to y0 register 3F (to be used as the previous calculation data in the next calculation procesing).

Figure 3:
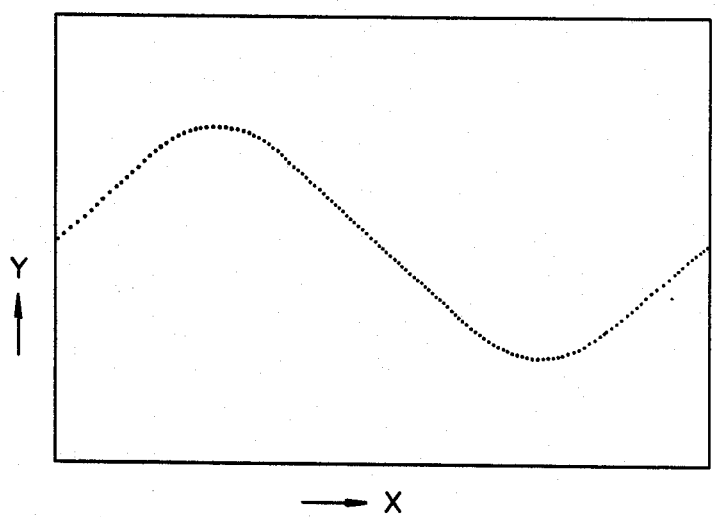
FIG. 3 shows a graph obtained by calculation of a functional formula preset in the formula buffer.

In step 41, the data of register 3G is incremented by one. In step 43, it is checked if the incremented data exceeds "95", which is the maximum display dot number in the X direction. If NO in step 43, the flow returns to step 25. The coordinates of the second and succeeding points are calculated by repeating steps 25 to 43. If YES in step 43, calculation is completed and a graph as shown in FIG. 3 is displayed at section 8.

Y-coordinate calculation subroutine 35 will be described in detail with reference to FIG. 5.

In step 45, (ymemo−ymin)/{(ymax−ymin)/63)} is calculated using the data set in ymemo register 3N, ymin register 3K, and ymax register 3L. The calculation result is set in y register 3H.

In step 47, control section 2 rounds off data in register 3H and obtains an integer value. In step 49, section 2 checks if the minimum y-coordinate data obtained by rounding off is smaller than "0". If YES in step 49, a hexadecimal code "FF" as error data is set in register 3H. However, if NO in step 49, control section 2 checks in step 51 if the y-coordinate is larger than "63". If YES in step 51, section 2 sets data "FF" representing an error in step 53. However, if NO in step 51, the current y-coordinate calculation is completed, and the flow advances to drawing processing subroutine 37 in FIG. 4.

Figure 6:
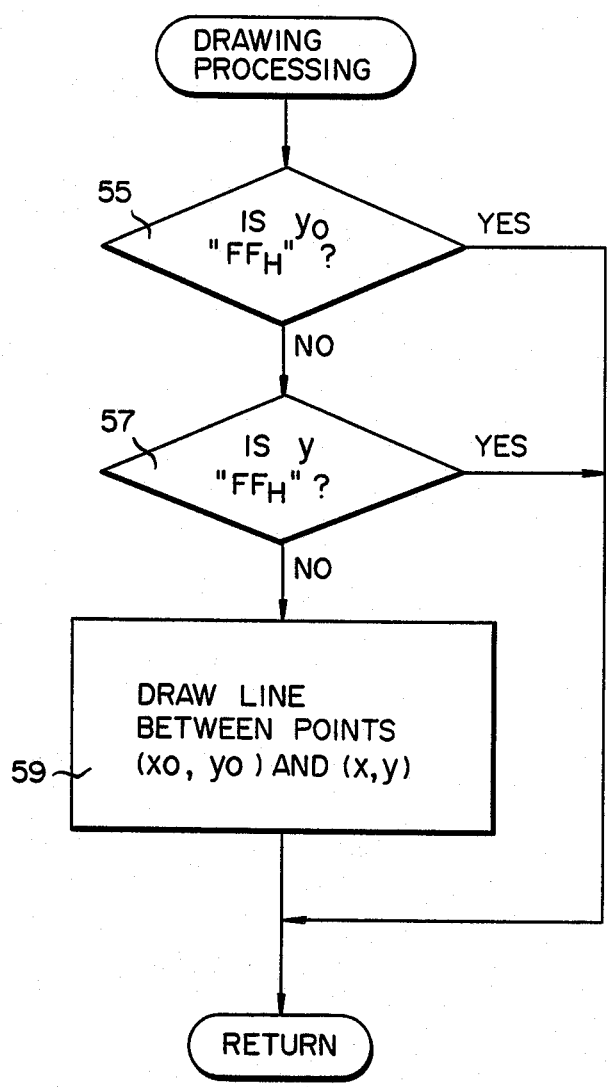

The operation of drawing processing subroutine 37 will be described in detail with reference to FIG. 6. In step 55, it is checked if the data in register 3F is code "FF" representing error data. If YES in step 55, the subroutine returns to the main routine and no display operation is performed for this coordinate.

However, if NO in step 55, control section 2 advances to step 57 and checks if the data of register 3H is error data "FF". If YES in step 57, no display operation is performed for this coordinate. However, if NO in step 57, the flow advances to step 59. In step 59, control section 2 performs a graph display operation to connect points between coordinate points (x0, y0) and (x, y) set in x0 register 3E, y0 register 3F, x register 3G and y register 3H. ON data for the area to be displayed is stored in graph display buffer 6A.

In the above embodiment, the coordinates of variable y are obtained with reference to the range data for variable x. However, the range data can be obtained from the coordinate data.

Figure 7:
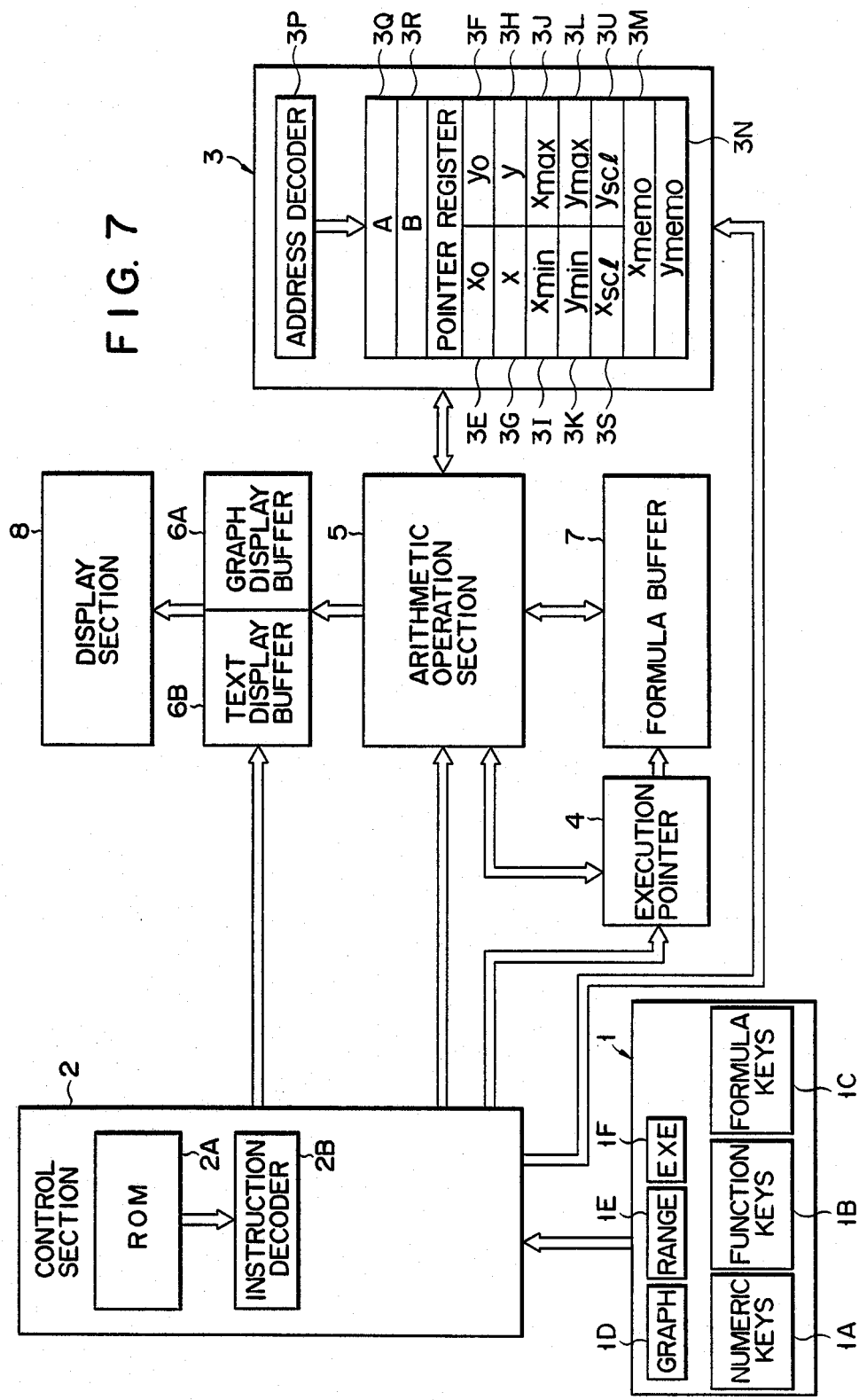
FIG. 7 is a block diagram of another embodiment of the present invention.

FIG. 7 is a block diagram showing a second embodiment of the present invention. The same reference numerals in FIG. 7 denote the same parts as in FIG. 1, and a detailed description thereof will be omitted. In this embodiment, RAM 3 has A register 3Q, B register 3R, and xSCL register 3S and ySCL register 3U for scale processing. Coordinate axis (X- and Y-axes) positions and their scale positions are calculated in accordance with preset variable ranges. When the calculated coordinate axis falls outside the display region on the screen, the scale is displayed at the edge of the screen closer to the corresponding axis.

The mode of operation of this embodiment will be described with reference to FIGS. 8 through 17 for the case wherein calculation is performed for a formula:

$$y = -\text{sin} x \quad (2)$$

In this case, minimum and maximum values defining the range of variable x, e.g., −180 and 180, are preset in xmin register 3I and xmax register 3J using range key 1E and numeric keys (0–9) 1A of key input section 1. Similarly, minimum and maximum values defining the range of variable y, e.g., −2 and 2, are preset in ymin register 3K and ymax register 3L. Scale data, e.g., 90 and 0.5 is preset in xSCL register 3S and ySCL register 3U.

Figure 8:
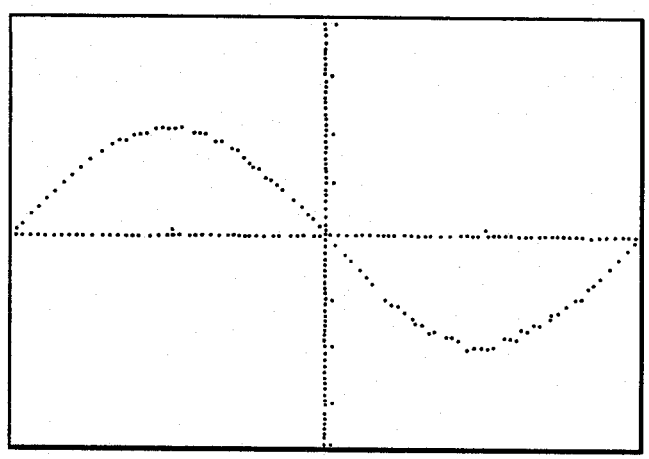
FIG. 8 shows a graph obtained by calculating an input functional formula.
Figure 9:
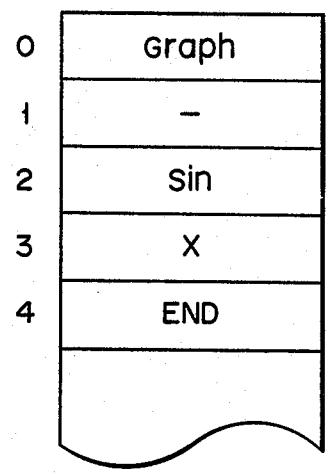
FIG. 9 shows data for a functional formula stored in a formula buffer.

When formula (2) above is input using formula key 1C, function key 1B, numeric keys (0–9) 1A, and EXE key 1F, addresses 0 through 4 of formula buffer 7 are addressed by execution pointer 4 and data representing formula (2) is written therein, as shown in FIG. 9. The value "4" of data "END" in pointer address 4 is END code data written upon operation of EXE key 1F. Arithmetic operation section 5 performs calculation of formula (2) and calculation for displaying the coordinate axes and scales, in accordance with the flow charts in FIGS. 13 through 17. The graph obtained from these calculations in displayed at display section 8, as shown in FIG. 8.

Figure 13:
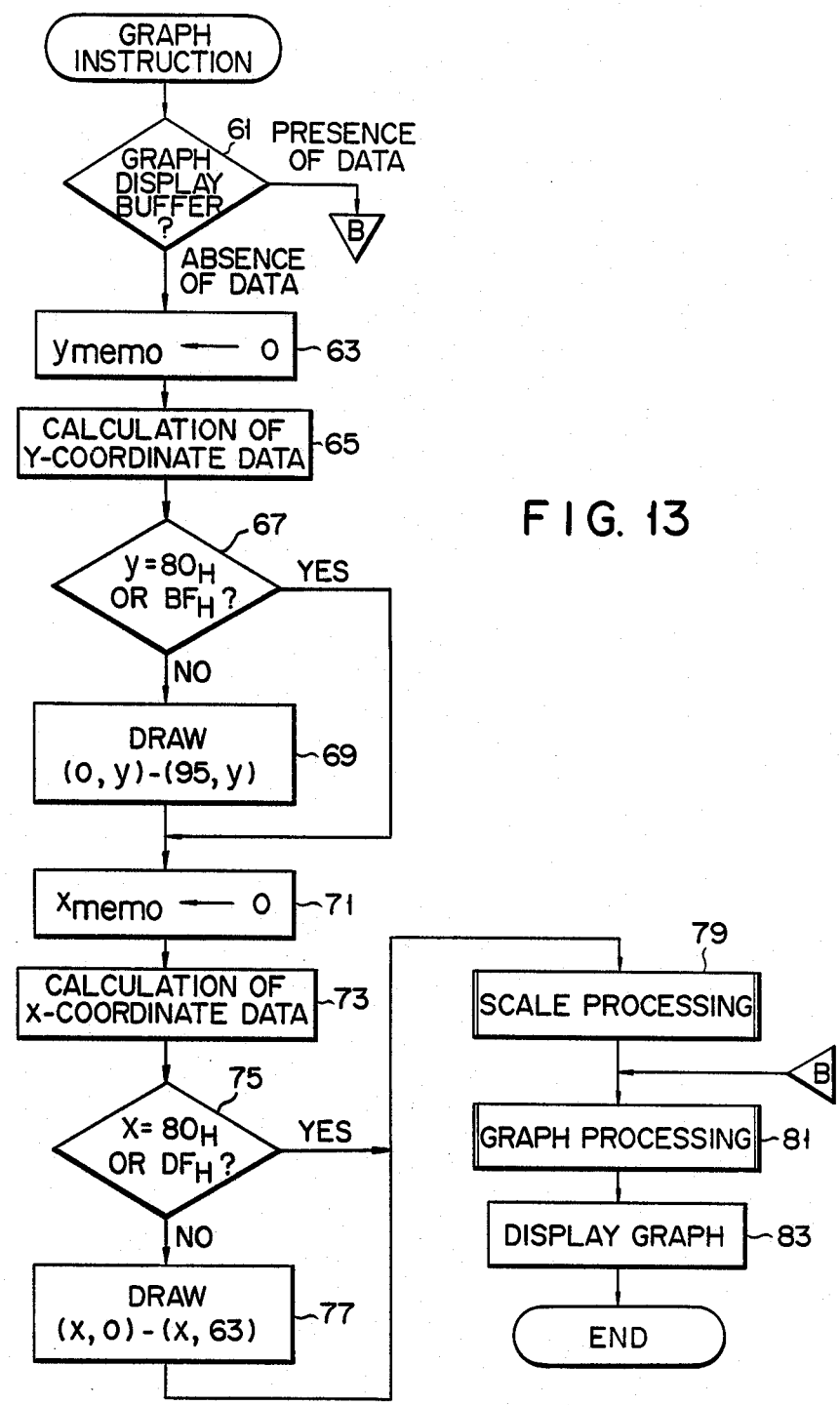
FIGS. 13 through 17 are flow charts of the procedure for displaying a graph together with coordinate axes and scales.

When a graph instruction is input, it is checked in step 61 if data is present in graph display buffer 6A, as shown in the main flow chart in FIG. 13. Since no data is present at the moment, ymemo register 3N is cleared in step 63, and y-coordinate calculation is performed in step 65. In step 67, it is checked if the data of y register 3H is "80" (HEX) or "BF" (HEX). Since NO in step 67 in this case, the flow advances to step 69, and a line is drawn between coordinate points (0, y) and (95, y). In the example shown in FIG. 11, the y-coordinate is calculated to be "32" in the sequence shown in FIG. 14. Xmemo register 3M is cleared in step 71, the x-coordinate is calculated in step 73, and it is checked in step 75 if the data in x register 3G is "80" (HEX) or "BF" (HEX). Since NO in step 75 in this case, the flow advances to step 77 and a line is drawn between coordinate points (x, 0) and (x, 63). In the example shown in FIG. 11, the x-coordinate is calculated to be "48" in the sequence shown in FIG. 14.

Figure 16:
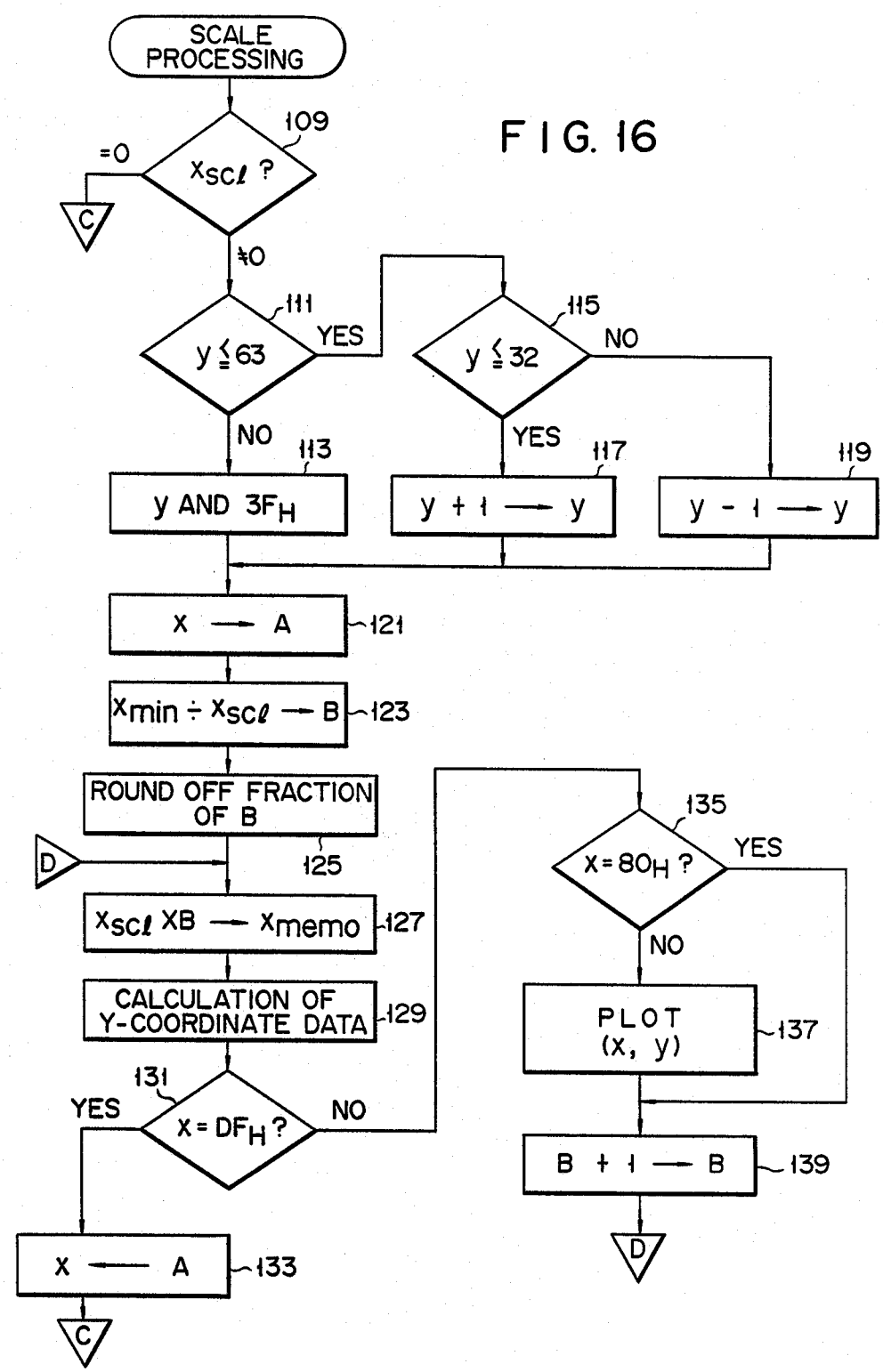

The flow then advances to step 79. Scale processing shown in FIG. 16 is performed. After scale processing, the flow advances to step 81. After graph processing shown in FIG. 4, graph display is performed in step 83.

If the data in register 3H is "80" (HEX) or "BF" (HEX) in step 67, an error has been detected and the flow advances to step 71. If it is determined in step 75 that the data in register 3G is "80" (HEX) or "DF" (HEX), an error has been detected and the flow advances to step 79.

The y-coordinate calculation in step 65 will be described with reference to the flow chart shown in FIG. 14. In step 85, the calculation of the y-coordinate value is performed in accordance with the data set in ymemo register 3N, ymin register 3K, and ymax register 3L. The calculation result is set in y register 3H.

Figures 10, 11:
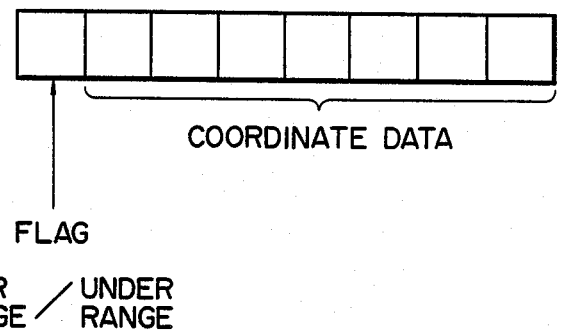
FIG. 10 shows the data format of x0 register 3E through y register 3H.
FIG. 11 shows an example of a display of key input range data.

In step 87, the set data is rounded off. In step 89, it is checked if the rounded value is smaller than "0", which is the minimum y-coordinate. If smaller than "0", the flow advances to step 91, and hexadecimal data "80" (HEX) is set in y register 3H. The hexadecimal data "80" (HEX) signifies that the data format of y register 3H and the like is an 8-bit format, as shown in FIG. 10. The MSB is an OVER RANGE/UNDER RANGE flag. In this case, a flag "1" representing UNDER RANGE is written. Minimum coordinate data "0" is set in the lower 7 bits of y register 3H.

If it is determined in step 89 that the data is larger than "0", the flow advances to step 93. It is checked in step 93 if the rounded data is larger than "63", which is the maximum y-coordinate. If YES in step 93, "BF" (HEX) is written in register 3G, flag "1" representing OVER RANGE and maximum coordinate data "63" are written in step 95, and the flow ends. If NO in step 93, the current y-coordinate is not OVER RANGE and the flow ends.

Figure 15:
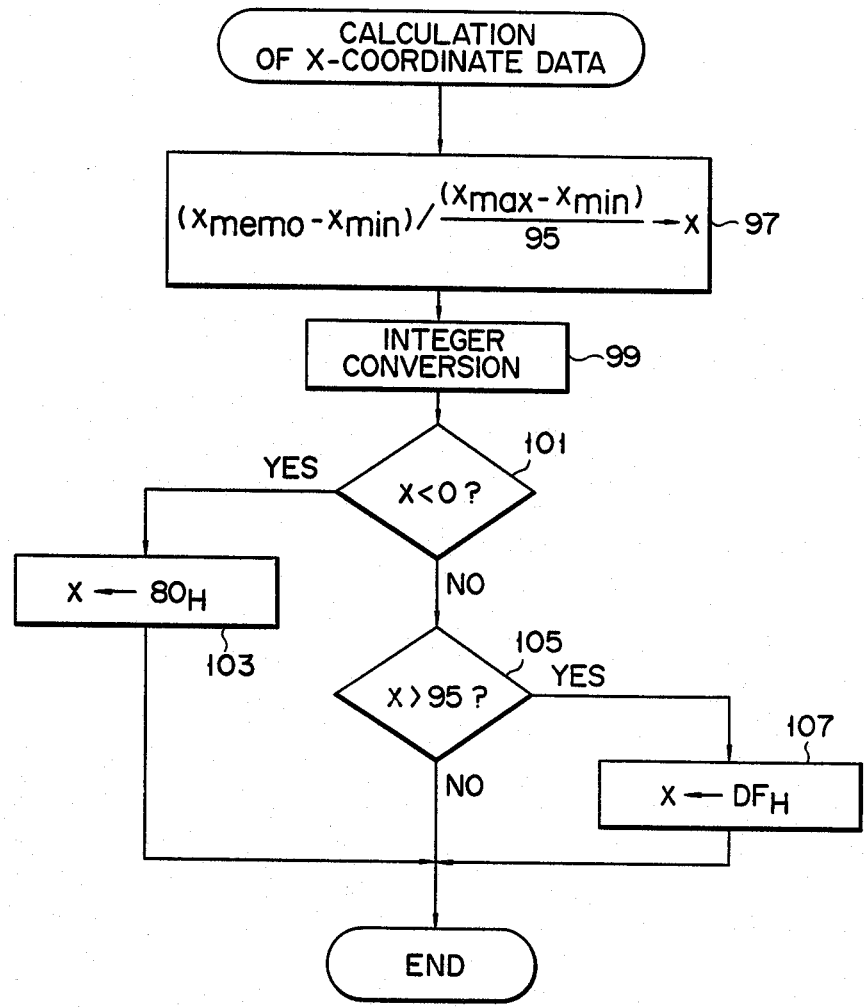

The x-coordinate calculation in step 73 will be described with reference to the flow chart in FIG. 15. In step 97, (xmemo−xmin)/{(xmax−xmin)/95} is calculated using the data in xmemo register 3M, xmin register 3I and xmax register 3J. The calculation result is set in x register 3G.

In step 99, the above-mentioned data in register 3G is rounded off, i.e., integer conversion is smaller than performed. In step 101, it is checked if the rounded data is "0". If YES in step 101, in step 103, a flag representing UNDER RANGE is set and minimum coordinate data "0" is written in register 3G in the same manner as in step 91.

However, is NO in step 101, it is checked in step 105 if the data in x register 3G is larger than "95". If YES in step 105, a flag representing OVER RANGE and hexadecimal data DF (HEX) representing the maximum coordinate data "95" are written in x register 3G in step 107 and the flow ends.

If NO in step 105, the coordinate is not OVER RANGE and the current x-coordinate calculation ends.

Figure 17:
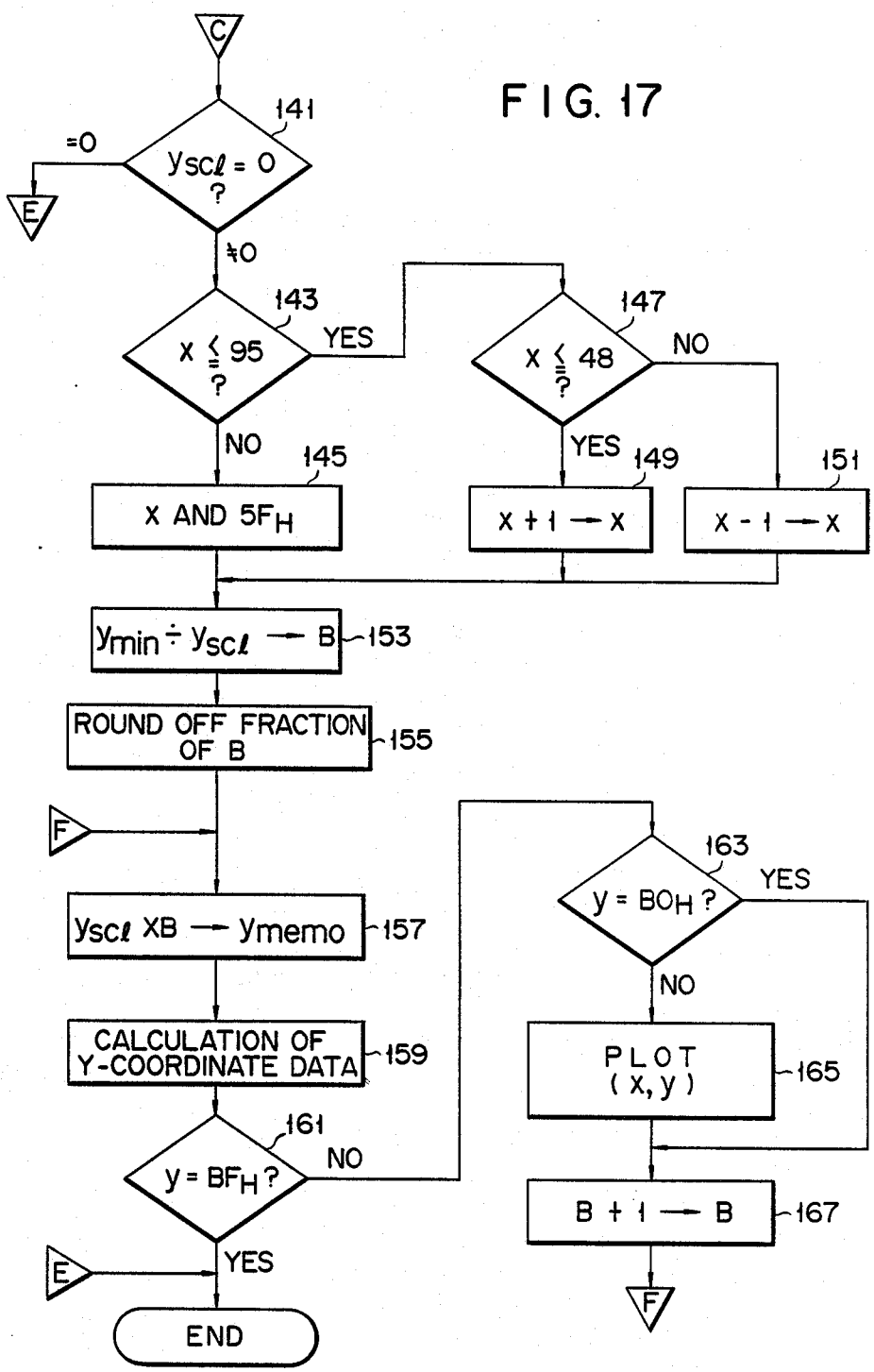
Figure 18:
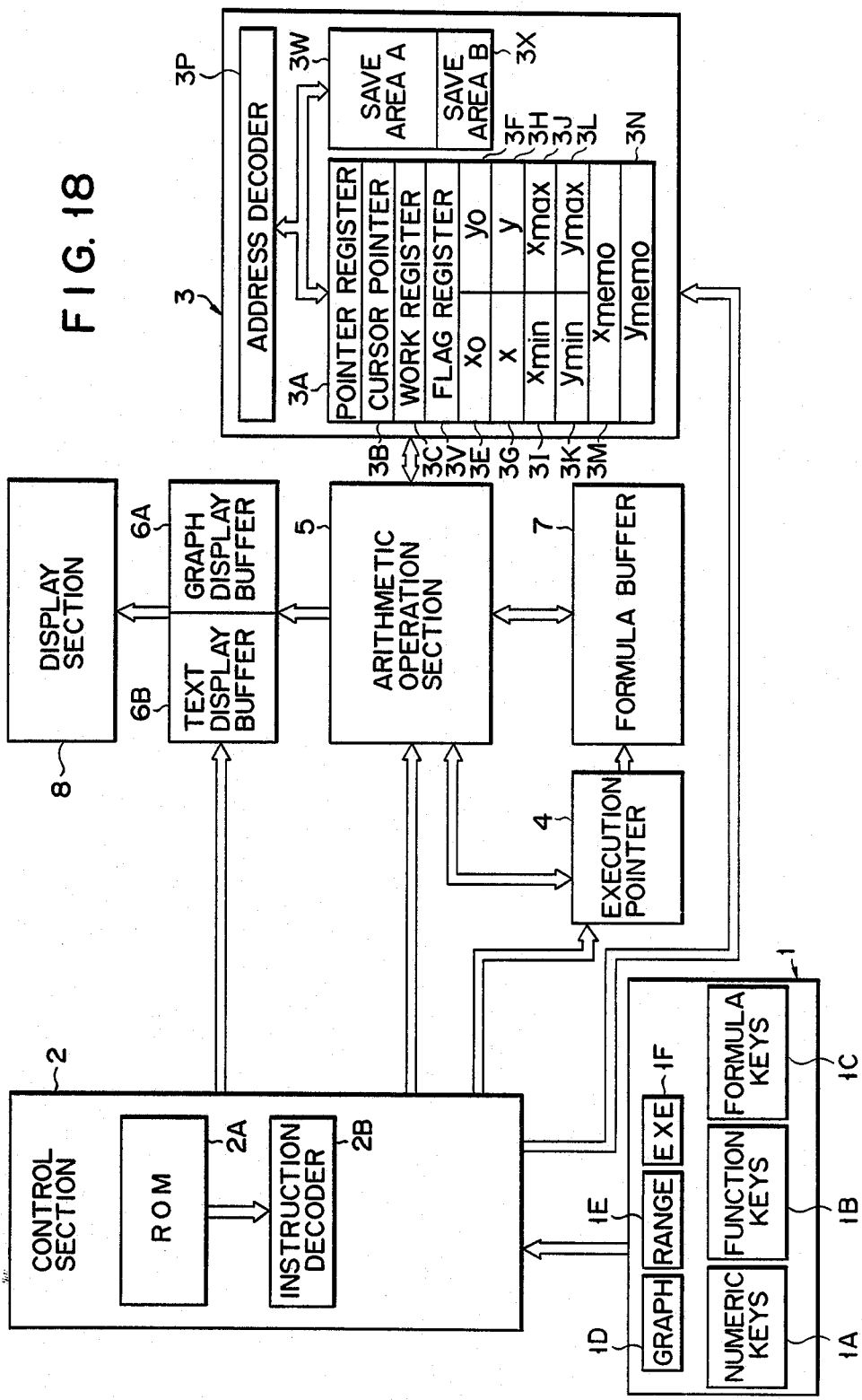
FIG. 18 is a block diagram of still another embodiment of the present invention.
Figure 19:
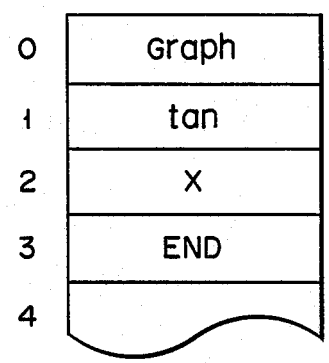
FIG. 19 shows data for a functional formula stored in the formula buffer.
Figure 20:
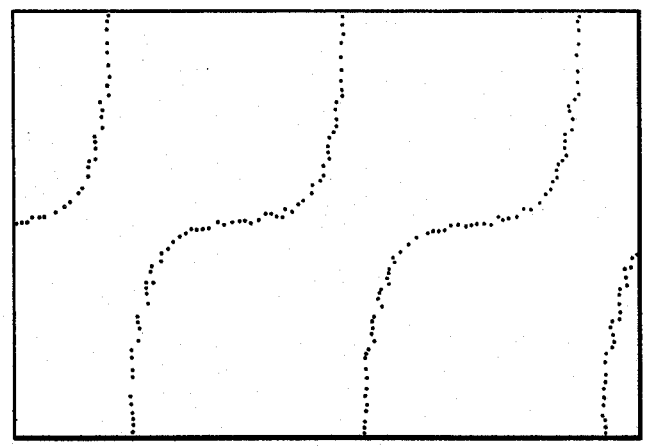
FIG. 20 shows a graph obtained from operating data for a functional formula stored in the formula buffer.

The scale processing in FIGS. 16 and 17 will be described.

In step 109, it is checked if the data in register 3S is "0". In this embodiment, the data is "90" as shown in FIG. 11. Therefore, the flow advances from step 109 to step 111. It is checked in step 111 if the current x-coordinate is equal to or less than "63". In the example shown in FIG. 11, YES is obtained in step 111, signifying that the y-coordinate is not OVER RANGE. Then, it is checked in step 115 if the y-coordinate is equal to or less than "32" as the central coordinate of the range. In this case, since the coordinate is less than "32", as shown in FIG. 11, the x-coordinate is below the center of display section 8. The flow advances to step 117. In step 117, the y-coordinate is incremented by one and the incremented value is set in y register 3H. As a result, for the X-axis, the scale is displayed above the X-axis, i.e., facing the wider spacer toward the center of the screen, as shown in FIGS. 12B and 12c.

In step 121, the coordinate data in x register 3G is saved in A register 3Q. The calculation of step 123 (−180÷90) is performed and "−2" is then set in B register 3R. In step 125, the data is rounded off. In step 127, the data "90" in register 3S and data "−2" in register 3R are multiplied, and the product "−180" is set in register 3M. In step 129, the x-coordinate data is calculated, as shown in FIG. 15. As a result of this calculation, the x-coordinate "0" is obtained in step 97. It is then checked in step 131 if the x-coordinate is "DF" (HEX). If NO in step 131, this x-coordinate is plotted in step 137. In step 139, the data in register 3R is incremented by one to "−1", and the flow returns to step 127.

In step 127, the data of xmemo register 3M becomes "−90". In step 129, the x-coordinate is calculated to be "23.75" according to step 97, and this data is rounded to "24".

In step 131, it is checked if the x-coordinate is "DF" (HEX). If NO in step 131, it is checked in step 135 if x="80" (HEX). If NO in step 135, the coordinate point (x, y) is plotted in step 137. The content of B register 3R is incremented by one in step 139, and the flow returns to step 127. Thus, the data in B register 3R becomes "0". The flow returns to step 127 and the data of xmemo register 3M becomes "0". In step 129, the x-coordinate is calculated to be "48", steps 131, 135, 137, and 139 are executed, and the data of register 3R becomes "1". The control flow returns to step 127, and the data of xmemo register 3M becomes "+90". In the x-coordinate calculation in step 129, the x-coordinate is calculated to be "71". Steps 131, 135, 137, and 139 are executed, and the data in B register 3R becomes "2". The control flow returns to step 127, and the data in xmemo register 3M becomes "2". In the x-coordinate calculation in step 129, the x-coordinate is calculated to be "95". Steps 131, 135, 137, and 139 are executed and data "3" is set in B register 3R. Step 127 is then executed and the data in xmemo register 3M becomes "270". In the x-coordinate calculation in step 129, the x-coordinate is "119" and is OVER RANGE. Therefore, YES is obtained in step 105, and data "DF" (HEX) is set in register 3G. Therefore, YES is obtained in step 131, and the data saved in A register 3Q is transferred back to x register 3G. The scale processing in step 141 is thus started, and four scale marks are attached to the X-axis by the data "90" in xSCL register 3S.

Since the data in ySCL register 3U is "0.5", it is determined not to be "0" in step 141 and the flow advances to step 143. It is checked in step 143 if the x-coordinate in register 3G is equal to or less than "95". In the example shown in FIG. 11, YES is obtained in step 143 and the flow advances to step 147. In step 147, it is checked if the Y-axis is to the right or left of the vertical central line on display section 8. In the example shown in FIG. 11, the Y-axis is to the left of the vertical central line. Since the x-coordinate of the Y-axis data is therefore less than "48", the flow advances to step 149 and the x-coordinate data of the Y-axis is incremented by one.

Figure 12A:
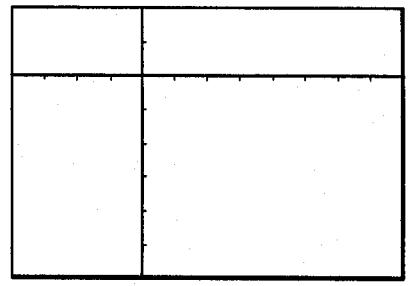
FIGS. 12A through 12D show examples of a scale display.
Figure 12B:
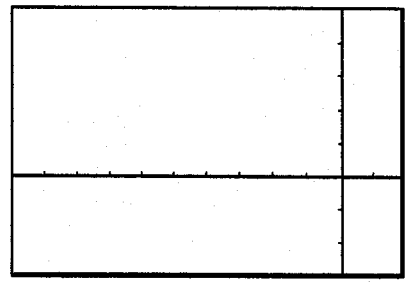
Figure 12C:
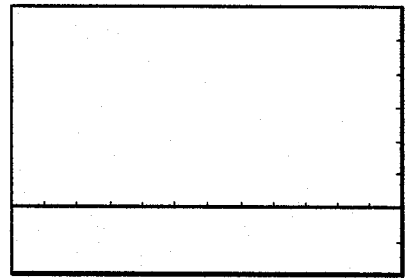

As shown in FIG. 12A, for the Y-axis, the scale is added on the right side of the Y-axis, i.e., the wider space facing the center of display section 8. Thereafter, steps 153 to 167 which are the same as steps 123 to 139 except for step 133 described above are repeatedly executed so as to perform calculations for obtaining the scale for the Y-axis.

However, if NO in step 11, the y-coordinate is larger than the maximum coordinate. Therefore, the flow advances to step 113. In step 113, the logical AND of the data in y register 3H and the data "3F" (HEX) is calculated, the upper 2 bits of y register 3H are cleared, and the flow advances to step 121.

Figure 12D:
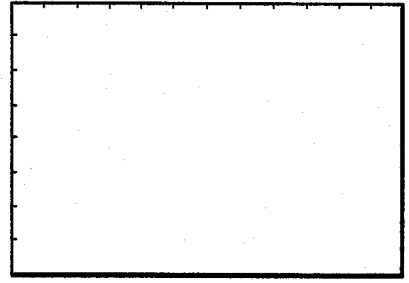

Steps 121 to 139 are executed, and scale processing for the X-axis is performed. As a result, for the X-axis, as shown in FIG. 12D, the scale is added below the upper edge (side) of the display screen to face the center of the screen.

If NO in step 115, the flow advances to step 119. The data in register 3H is decremented by one, and the flow advances to step 121. In this case, the x-coordinate is located above the center of display section 8. The scale for the x-coordinate is added facing downward, i.e., toward the wider space, as shown in FIG. 12A.

If NO in step 143, since the x-coordinate exceeds the maximum coordinate, the flow advances to step 145. In step 145, the logical AND of the data in register 3G and data "5F" (HEX) is calculated, and the MSB thereof is cleared. Steps 153 to 167 are executed, and scale processing for the Y-axis is performed. The scale for the Y-axis is attached to the right edge (side) of the screen to face the center of the screen, as shown in FIG. 12C.

A NO in step 147 signifies that the Y-axis is located to the right of the center of display section 8. Therefore, in step 151, the x-coordinate data for the Y-axis is decremented by one, and the difference is set in x register 3G. Steps 153 to 167 are performed to calculate the scale data for the Y-axis. As a result of this calculation, the scale is added to the left side of the Y-axis, i.e., to face the wider space toward the center of display section 8, as shown in FIG. 12B.

In the display example shown in FIG. 12D, the calculated coordinate axes both deviated from the display region. More specifically, the y-coordinate for the X-axis exceeded its maximum, and the x-coordinate for the Y-axis was below the minimum.

The detailed contents of the graph processing routine of FIG. 13 are the same as those of routine 81 of FIG. 4, and a detailed description thereof will be omitted.

Figure 5:
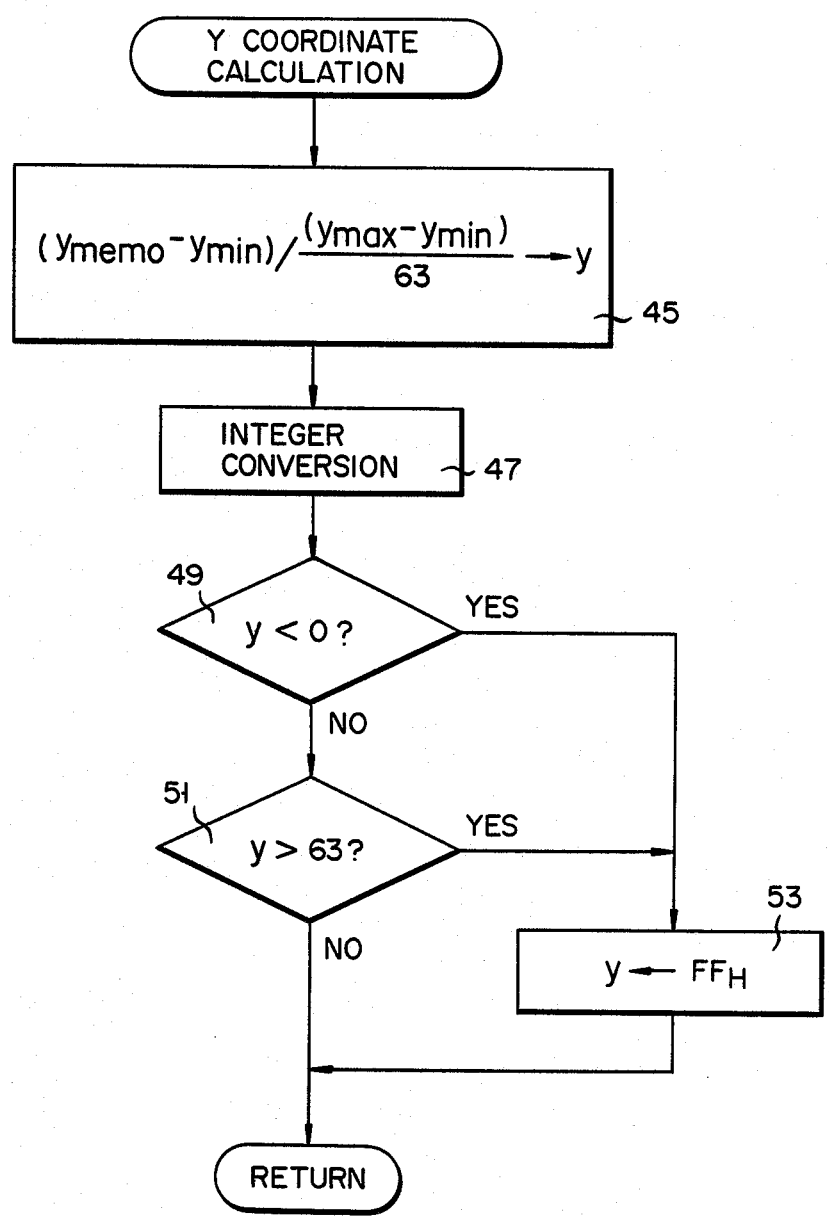

In the above embodiment, drawings processing routine 37 shown in FIG. 4 remains the same as in FIG. 5 except for the following points. First, in step 55 of FIG. 6, it is checked if the upper bits of y0 register 3F represent data "FF" indicating OVER or UNDER RANGE. Second, in step 57, it is checked if the data of the upper bits (4 bits) represent data "FF" representing OVER or UNDER RANGE.

FIGS. 18 through 22B shows still another embodiment of the present invention. The same reference numerals as in the former embodiments denote the same parts in this embodiment, and a detailed description thereof will be omitted. Storage section 3 of an electronic calculator of this embodiment has also flag register 3V for storing three flags to be described later; and save areas A 3W and B 3X for receiving and saving the display data transferred from text display buffer 6B.

In this embodiment, when the graph of a functional formula is displayed, a determination is made whether to connect a current coordinate point and a previous coordinate point with a line in accordance with the positional relationship between the two points.

The mode of operation of this embodiment will be described with reference to FIGS. 18 through 22B. a case will be exemplified by the functional formula below:

$$y = \tan x \tag{3}$$

As in the former embodiments, the maximum and minimum values defining a range for independent variable x are preset in xmin register 3I and xmax register 3J in this embodiment. Similarly, the maximum and minimum values defining a range for dependent variable y are preset in ymin register 3K and ymax register 3L. Since the main flow chart in this embodiment is basically the same as that shown in FIG. 4, it will not be described.

Figure 14:
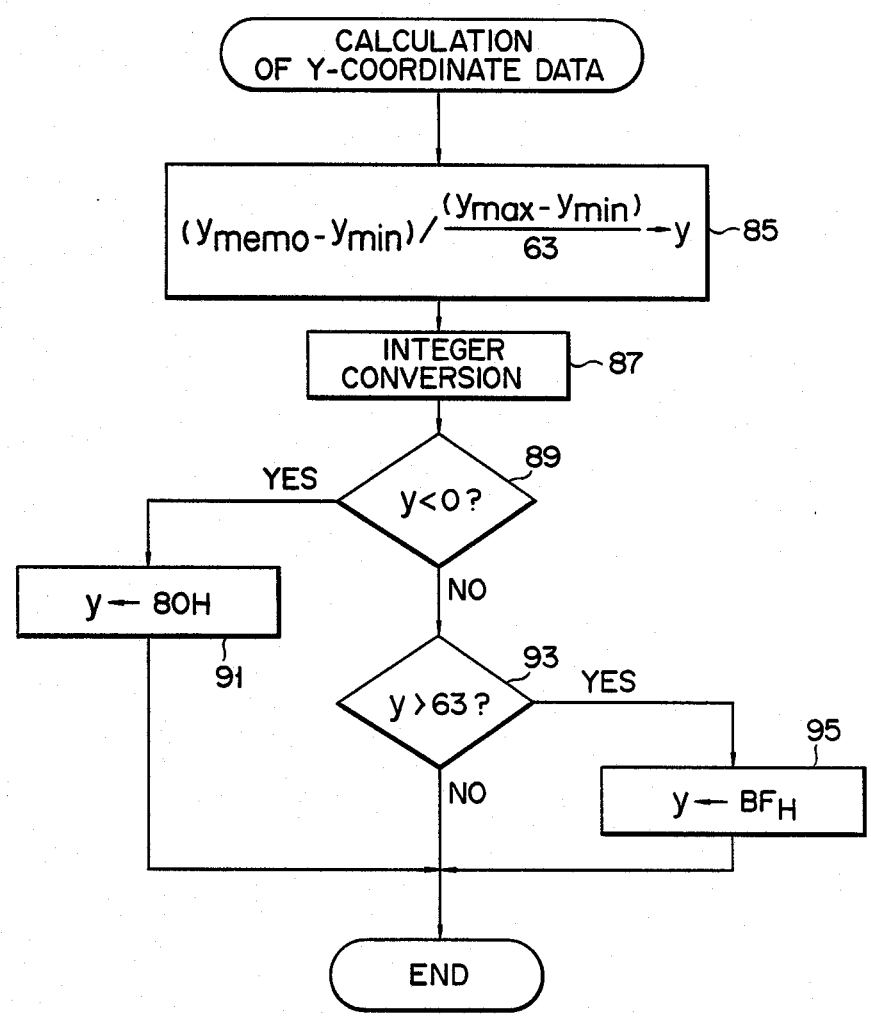

In step 35 of FIG. 4, the processing for y-coordinate calculation is the same as in the flow chart in FIG. 14 except for the following exceptions. First, in this embodiment, in step 89 of FIG. 14, if the data of y register 3H is "0", the data of OVER RANGE is set in step 91. If NO in step 91 and the data of y register 3H is larger than "63" in step 93, the data of UNDER RANGE is set in step 95.

Figure 21:
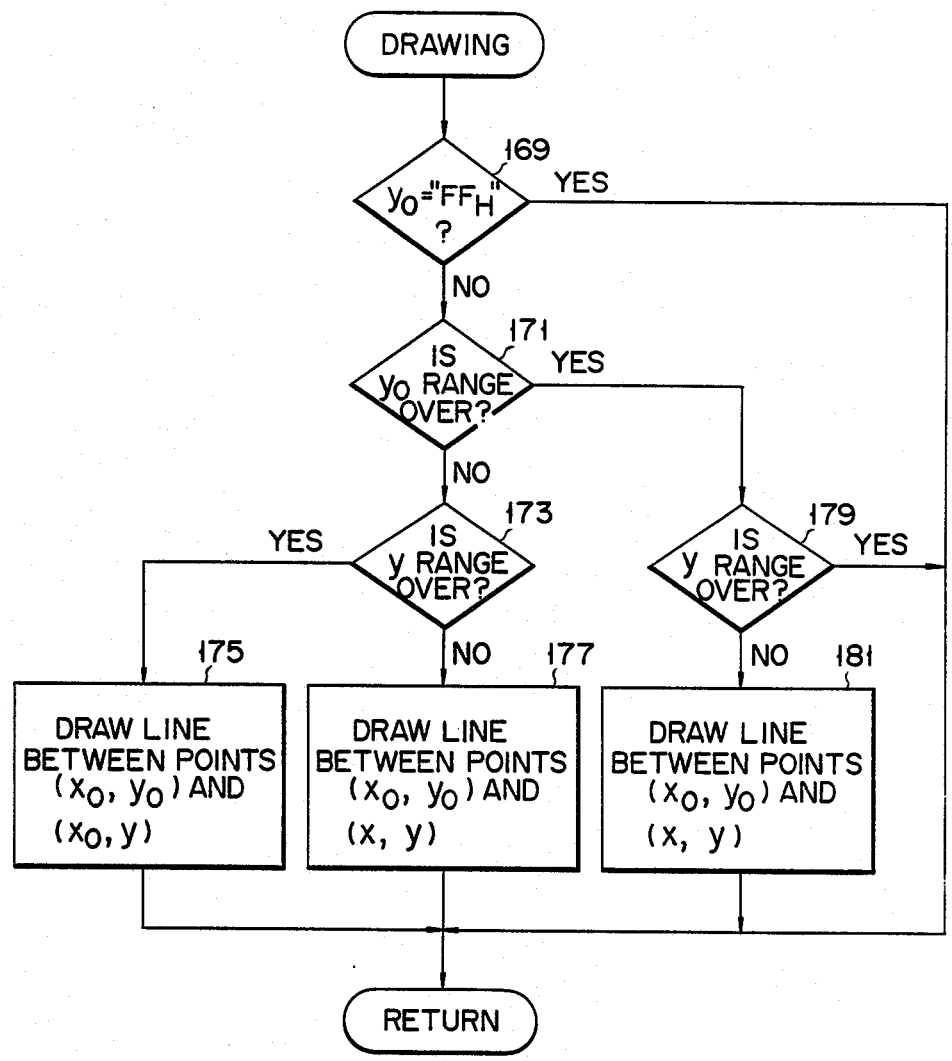
FIG. 21 is a flow chart of the operation sequence in the embodiment shown in FIG. 8.

Details of the operation for drawing processing in FIG. 4 will be described below with reference to FIG. 21. In step 169, it is checked if the data in y0 register 3F is error data "FF". If YES in step 169, the flow chart ends, and the corresponding coordinate is not displayed.

However, if NO in step 169, the flow advances to step 171. In step 171, it is checked if the data of y0 register 3F is "OVER RANGE". If NO in step 171, it is checked in step 173 if the data of y register 3H is "OVER RANGE". If YES in step 173, the situation corresponds to the one shown in FIG. 22A: the current coordinate point falls outside the display range, and the previous coordinate point falls inside the range. In such a case, the flow advances to step 175 and display processing is performed to draw a line between the two coordinate points. More specifically, the hatched dots in FIG. 22A which are not turned on in a conventional electronic calculator are turned on in this embodiment.

Therefore, the graph is displayed up to the boundary of the display range, and is easy to see.

A NO in step 173 signifies that neither of the previous and current coordinate points falls outside the range. The two coordinate points are thus connected with a line in step 177, and normal display is performed.

If YES in step 171, it is checked in step 179 if the data of y register 3H is "OVER RANGE". If NO in step 179, it is the case opposite to the one shown in FIG. 22A: the previous coordinate point falls outside the display range, and the current coordinate point falls inside the range. Therefore, the flow advances to step 181, and the graph is drawn to the boundary of the display range.

Figure 22B:

A YES in step 179 signifies that both the previous and current coordinate points fall outside the display range, as shown in FIG. 22B. In this case, an error is detected, the two coordinate points are not connected, and graph display is not performed.

FIGS. 23 through 26 show still another embodiment of the present invention. The same reference numerals as in the former embodiments denote the same parts in this embodiment, and a detailed description thereof will not be made. In this embodiment, the graphs of general functions (functions incorporated in function electronic calculators: sin, log, $x^2$, 1/x, etc.) can be displayed in accordance with functional calculations with only simple input operations.

Figure 23:
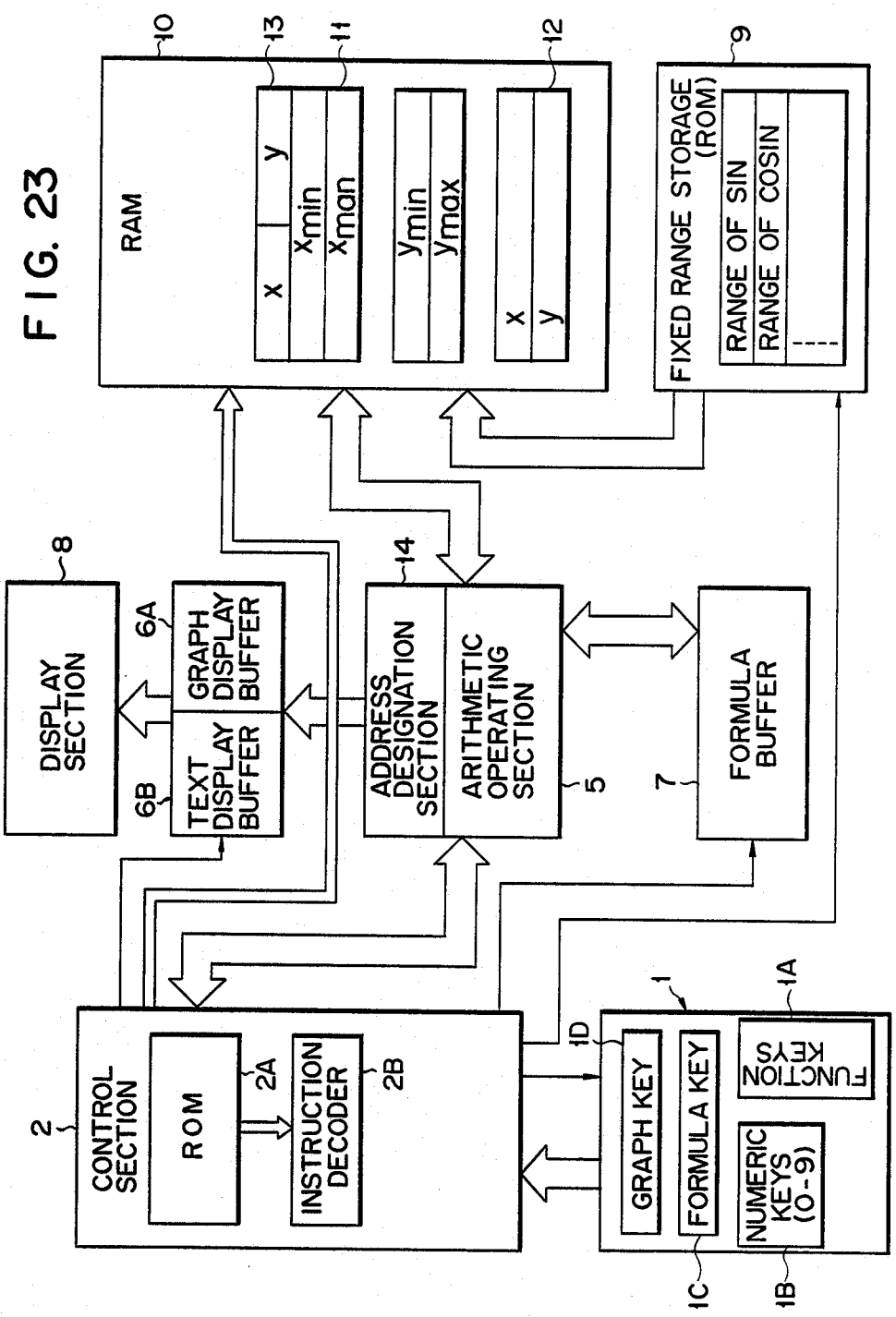
FIG. 23 is a block diagram showing still another embodiment of the present invention.

Referring to FIG. 23, key input section 1 has function keys 1A, numeric keys 1B, formula keys 1C, and graph keys 1D. Function keys 1A include four arithmetic operation keys and an EXE key. Numeric keys (0-9) 1B have 0 through 9 keys for numeric input. Function keys 1C include sin, log, $x^2$, and 1/x designation keys. Graph keys 1D include a key for designating a graph and a key for TEXT for designating a formula or equation. Key input data from section 1 is supplied to control section 2. Arithmetic operation section 5 has address designating section 14 for addressing display buffers 6A and 6B to be described later. Section 5 is connected to control section 2. Data supplied to control section 2 is written in formula buffer 7 through section 5. LCD display section 8 has M (e.g., 96) dots in the horizontal direction and N (e.g., 64) dots in the vertical direction. Display section 8 is connected to section 14 through graph display buffer 6A and text display buffer 6B. Buffers 6A and 6B comprise programmable RAMs and each memory element has a one-to-one correspondence with each dot at display section 8. Each memory element is turned on or off in accordance with the address designation by section 14. Buffer 6A stores graph data, and buffer 6B stores display data for a formula or equation. Control section 2 controls so that the contents of one of buffers 6A and 6B are displayed at display section 8. ROM 2A in control section 2 stores preset functional formulas such as $Y=\sin X$, $Y=\log X$, $Y=X^2$, or $Y=1/X$. Fixed range storage section 9 stores preset fixed data for the range of each function and range data (fixed range) for each preset functional formula. For example, as shown in FIG. 25A, in the case of a sine function, Xmin = $-360°$ and Xmax = $+360°$ for two periods, and corresponding y-coordinate data sufficient for graph display, e.g., Ymin = $-1.6$ and Ymax = $+1.6$. Storage section 10 comprising a programmable RAM is connected to control section 2. Storage section 10 has range storage section 11, plot data storage section 12, and dot data storage section 13. Storage section 11 temporarily stores range data (Xmin and Ymin and corresponding ymin and ymax) for one selected preset functional formula (selected from, e.g., sin, log, $X^2$, and 1/X). Section 12 stores the value that variable X can take, and the corresponding value of variable Y for the selected preset functional formula. Section 13 stores the operation results from section 5, e.g., range data corresponding to 96 dots in the horizontal direction (X direction) and 64 dots in the vertical direction (Y direction), i.e., the values of variables x and y, of a unit pixel defined by Xmin and Xmax and Ymin and Ymax. Section 5, buffer 7 and storage section 10 are connected with a bidirectional bus. Fixed-range storage section 9 is connected to send range data, i.e., Xmin, Xmax, Ymin, and Ymax, to storage section 10.

Figure 24:
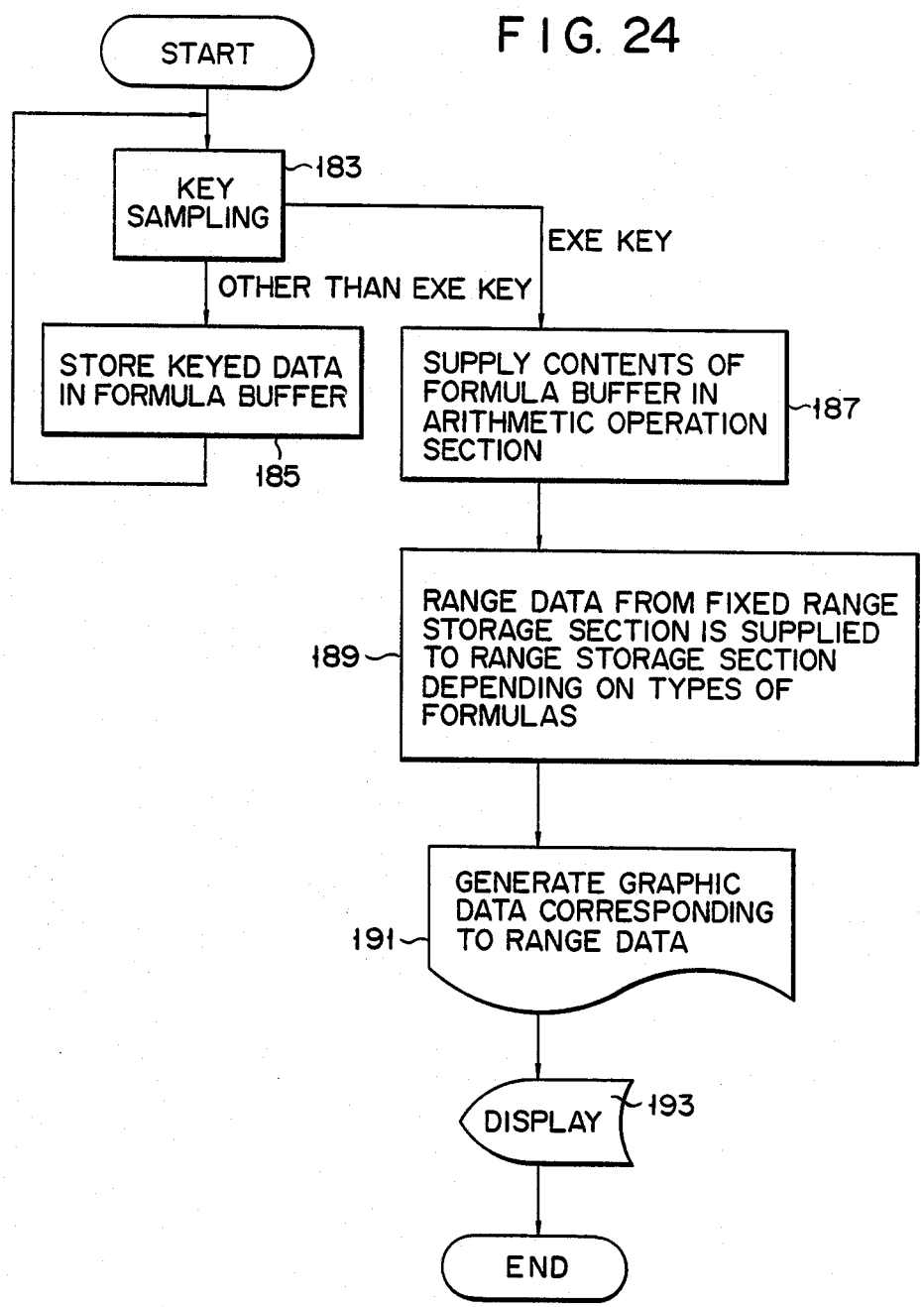
FIG. 24 is a flow chart explaining the operation of the embodiment shown in FIG. 23.

The mode of operation of the embodiment shown in FIG. 23 will be described with reference to the flow chart shown in FIG. 24. A case for displaying the graph of preset functional formula $Y=\sin X$ in FIG. 25A will be described. When keys 1D, 1C and 1A are operated to designate the graph, sin and EXE modes at section 1, the graph and sin commands are input to buffer 7 through section 2 and section 5 (steps 183 and 185). Then, the preset sing function $Y=\sin X$ is fetched by section 2 and supplied to section 5 (step 187). Section 2 then instructs the sin range stored in fixed range storage section 9, i.e., range information (Xmin and Xmax and corresponding Ymin and ymax) to be supplied to section 11 of section 10 (step 189). Control section 2 supplies an instruction to section 5 by a program stored in ROM 2A to calculate (Xmax−Xmin)/M, e.g., $\{360° - (-360°)\}/96 = 7.5°$, and (Ymax−Ymin)/N, e.g., $\{1.6 - (-1.6)\}/64 = 0.05$, and to set the calculated values in section 13. This means that the X- and Y-coordinates of the unit pixel are 7.5° and 0.05, respectively. Thereafter, section 5 calculates $Y=\sin(X)$ from Xmin to Xmax in units of 7.5° fetched from section 13. When x corresponds to dot address 1, $Y=\sin\{(-360°)+7.5°56 = \sin(-352.5°)$, which is $\sin(0.131) = 0.131$ when expressed in radians. $X=(-352.5°)$ and $Y=0.131$ are temporarily stored in section 12. Section 5 next calculates the vertical dot address corresponding to horizontal dot address 1 in accordance with 0.05 fetched from section 13 and Y=0.131 fetched from section 12. Thus, 0.131/0.05 = 2.6 is calculated from y=Y/0.05. However, since no dot exists for address 2.6, section 5 rounds off the number and assigns the dot to address 3. X and Y ar calculated by section 5 according to the range information, and stored in the X and Y memories of section 12. The address (1, 3) corresponding to the display position on display section 8 is designated by section 14 and stored in buffer 6A. Next, section 5 calculates $Y=\sin(-345°)=\sin 15°=0.258$ for $X=(-352.5°+7.5°)$ when x is a dot at address 2. $X=-345°$ and $Y=0.258$ are temporarily stored in section 12. Section 5 calculates the vertical dot address corresponding to the horizontal dot address 2 as 0.258/0.05 = 5.1 from y=Y/0.05 using 0.05 fetched from section 13 and Y=0.258 fetched from section 12. Since no dot exists for vertical address 5.1, section 5 rounds off the number to assign address 5. The address (2, 5) for the next display point on display section 8 is designated by section 14 and stored in buffer 6A. In this manner, the x- and corresponding y-address dots on display section 8 are calculated up to Xmax and Y=-sin(Xmax), designated by section 14, and stored in buffer 6A (step 191). All the addresses to be turned on and stored in buffer 6A are transferred to display section 8 and the sin function is displayed as a graph (step 193). When buffer 6B is selected by an instruction from section 2, the formula of the sin function is displayed on section 8. A graph can be similarly displayed when a cos function, a tan function or the like is designated, as shown in FIGS. 25B and 25C.

Figure 26:
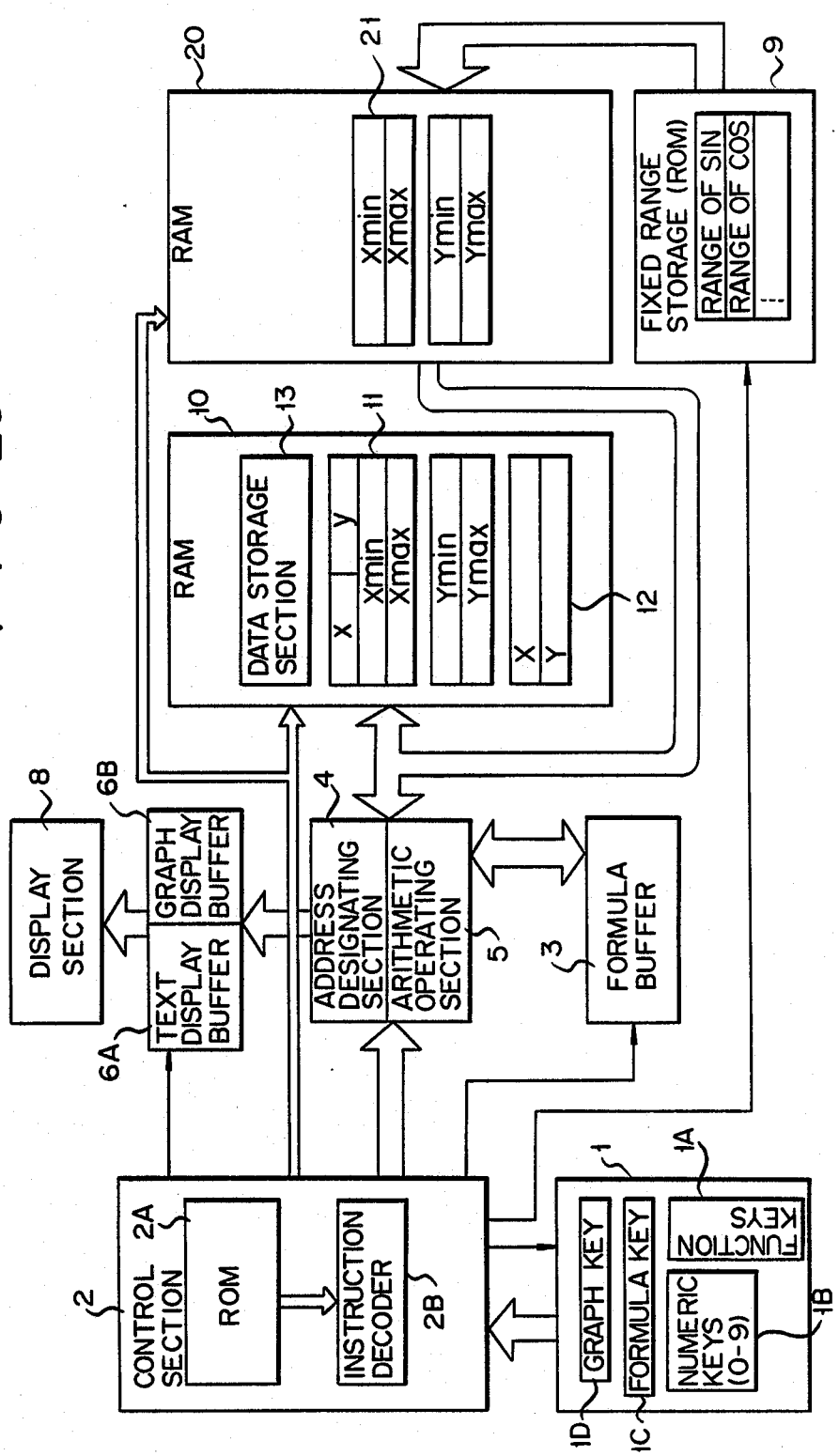
FIG. 26 is a block diagram showing a modification of the embodiment shown in FIG. 23.

FIG. 26 shows a modification of the embodiment shown in FIG. 23. The characteristic feature of this modification is the provision of special storage section 20 for displaying the graph of a preset functional formula. Section 20 has a range storage section 21 of the same configuration as range storage section 11 in section 10. Section 21 stores range data of a selected preset functional formula from fixed range storage section 9. A graph is displayed using plot data storage section 12, dot data storage section 13 of storage section 10, and operation section 5 in the same manner as in the embodiment shown in FIG. 23. Section 11 can storage range data manually set by the operator, so that any graph can be displayed in accordance with the operator's command.

In the modification shown in FIG. 26, two types of range storage sections 11 and 21 are provided as a range data storage section. Therefore, the graph of a preset functional formula and the graph of a function designated by the operator can be displayed overlapping each other.

FIG. 27 is a block diagram of still another embodiment of the present invention. In this embodiment, when overlapping graph display data is supplied, graph display data preset in a display buffer need not be cleared and both sets of the data can be displayed overlapping each other.

Referring to FIG. 27, storage section 3 has previous plot register 187, current plot register 189, Xmin register 191, Xmax register 193, Xscale register 195, Ymin register 197, Ymax register 199, Yscale register 201, Xmemory register 203, Ymemory register 205, x register 209, y register 207, and arithmetic data storage section 211.

Registers 187, 189, 191, 193, 195, 197, 199, 201, 203, 205, 207, and 209 and sections 185 and 211 are used to draw a graph. Section 185 stores data before operation, and section 211 stores operated data. A graph is drawn by converting true coordinate data (X, Y) with reference to the origin of each set of calculated X- and Y-axes into display coordinate data (x, y) with reference to the lower left corner as a reference point of the display screen. The previous and current plots represent the previous coordinate point (x0, y0) and current coordinate point (x, y) when a graph is drawn by sequentially determining values of y when the value of x is sequentially incremented, 1, 2, 3, . . . . The X and Y memories store the coordinate data (X, Y) calculated from a formula, and x and y registers 209 and 207 store the display coordinate data (x, y) obtained by conversion from the true coordinate data (X, Y). Xmin, Xmax, Xscale, Ymin, Ymax, and Yscale represent the range data signals which define the display range for a graph on the display screen. Xmin and Xmax represent the values of X at the left and right ends of the X-axis on the screen, and Ymin and Ymax similarly represent the values of Y at the lower and upper ends of the Y-axis on the screen. Xscale and Yscale represent the scale pitches along the X- and Y-axes on the screen.

Formula data F(X) input from key input section 1 is preset in formula buffer 7. The graph operation as described above is performed by section 5 in accordance with the input data F(X). The obtained result in preset in registers 187, 189, 203, 205, 209, and 207. The coordinate data in previous and current plot registers 187 and 189 and graph display data consisting of each coordinate data connecting the previous and current plots are sequentially preset by operation section 5 to graph display buffer 6A. Formula data F(X) in buffer 7 is preset in buffer 6B through section 5. Either the graph display data in buffer 6A or formula data F(X) in buffer 6B is selected by a switching signal from control section 2 and is displayed at display section 8. Section 8 comprises an LCD of a 96×64 dot matrix display type. Buffers 6A and 6B have 96×64 bit dot areas corresponding to section 8 and set "1"s in dot areas to be displayed. Data is preset in buffers 6A and 6B in accordance with address data from data storage section 185 which is incremented by control section 2. The address data is decoded by address decoder 183 in order to address buffers 6A and 6B.

Figure 28:
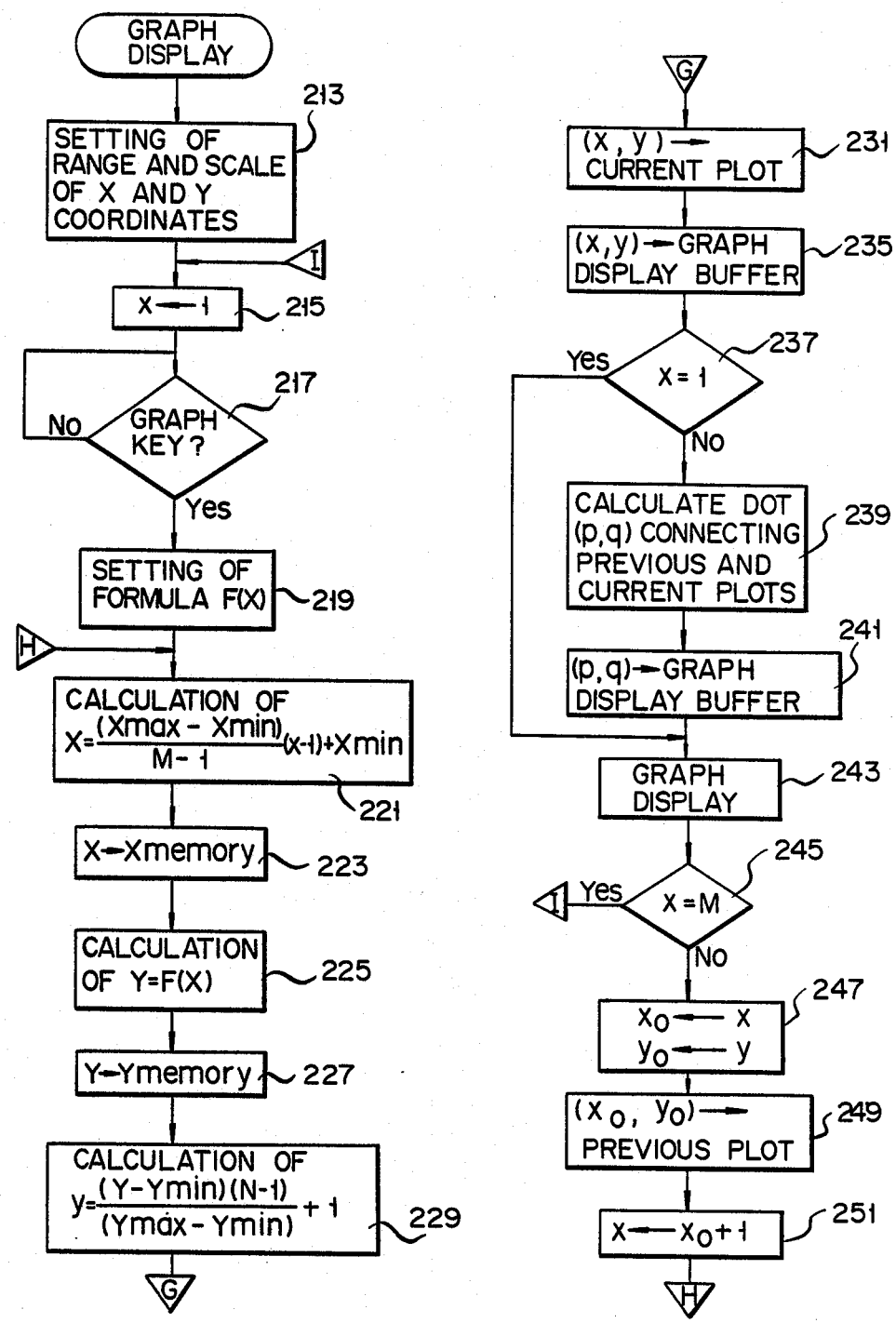
FIG. 28 is a flow chart of processing for the overlapping display of a plurality of graphs.
Figure 31:
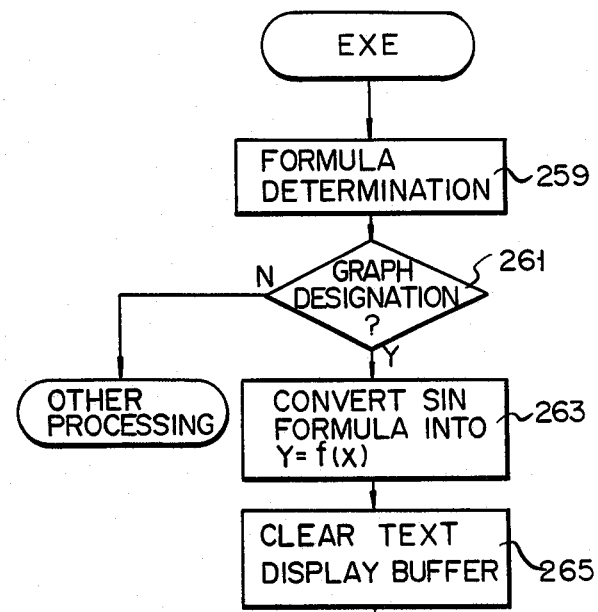
FIGS. 30 and 31 are flow charts explaining the modes of operation of the embodiment shown in FIG. 29.
Figure 30:
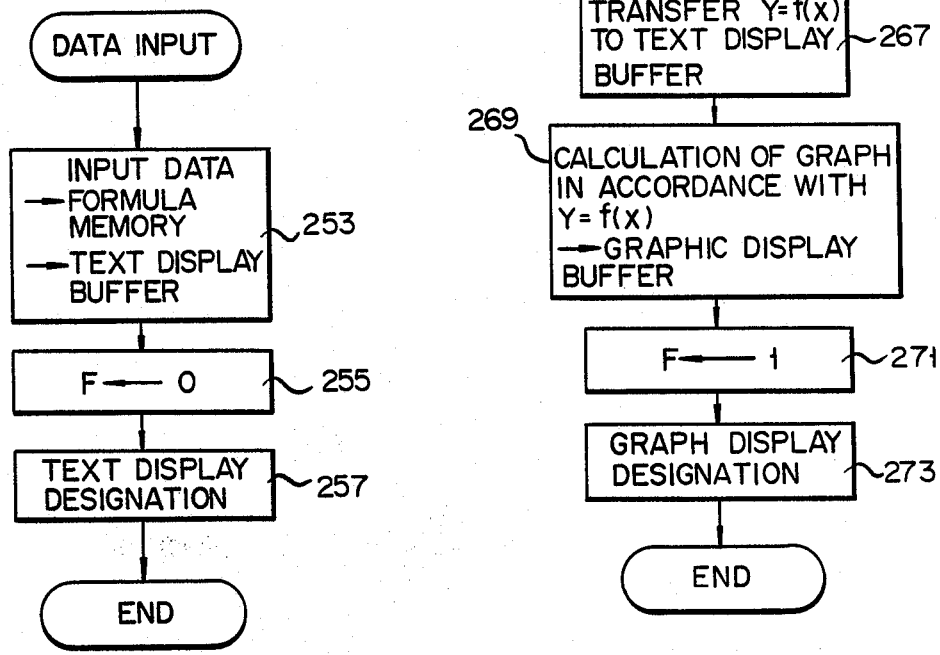

The mode of operation of this embodiment will now be described with reference to FIG. 28.

In order to display the graph, range key 1E is operated to set the range mode, and range values Xmin, Xmax, Xscale, Ymin, Ymax, and Yscale representing the graph display range are input using alphanumeric keys 1A. Control section 2 presets the range data in registers 191, 193, 195, 197, 199, and 201 in section 3 (step 213). "1" is set as the display x-coordinate in registers 209 and 207 (step 215), and operation of graph key 1D is awaited (step 217). When formula data F(X), e.g., $X^2$ is input from section 1, section 2 presets the formula data $F(X)=X^2$ in buffer 7 (step 219). The x-coordinate "1" with reference to the lower left corner of display section 8 is substituted in:

$$X=\{(X\max-X\min)(x-1)\}/(M-1)+X\min$$

to be converted into a true X-coordinate (step 221), and the X value is preset in X memory register 203 (step 223). M has a value "96" which is the number of dots along the X-axis of display section 8.

Subsequently, control section 2 substitutes the true X-coordinate in formula data $F(X)=X^2$ to calculate the corresponding true Y-coordinate (step 225), and the Y value is preset in Y memory register 205 (step 227). Section 2 also substitutes the true X-coordinate in:

$$y=\{(Y-Y\min)(N-1)\}/(Y\max-Y\min)+1$$

to reconvert it into the display y-coordinate (step 229). The y and x values from registers 209 and 207 are preset in register 189 as display coordinate data (x, y) (step 231). N has a value "64" which is the number of dots along the Y-axis of display section 8.

Control section 2 presets the display coordinate data (x, y) in buffer 6A (step 235). If the display x-coordinate is not "1", section 2 determines that the previous plot data is present, calculates each coordinate data (p, q) connecting the previous and current plots, presets each coordinate data (p, q) in buffer 6A (steps 237, 239, and 241), and displays a graph at section 8 (step 243). In this case, if the display coordinate data for the previous plot is (15, 4) and that for the current plot is (16, 8), coordinate points (15, 5), (15, 6) and (16, 7) are obtained and displayed as coordinate data (p, q). However, if the display x-coordinate is "1", only one display coordinate point has been plotted and no previous plot data is present. Therefore, steps 239 and 241 are not performed.

Subsequently, if the display x-coordinate has not reached "M=96", control section 2 determines that plotting over the entire display screen has not been completed (step 245). Section 2 presets the current plot display coordinate data (x, y) as the previous plot display coordinate data (x0, y0) in previous plot register 187 (steps 247 and 249). The value obtained by incrementing x0 is set as the display x-coordinate (step 251). Calculation of display coordinate data from formulas in steps 221, 223, 225, 227, 229, and 231, and graph display in steps 235, 237, 239, 241, and 243 are repeated.

When the display x-coordinate reaches "M=96", section 2 determines that plotting over the entire display screen has been completed (step 245), sets "1" as the display x-coordinate (step 215), and awaits operation of graph key 10 (step 217). When formula data F(X), e.g., 2X+4 is input, similar graph display processing is performed for formula data $F(X)=2x+4$, and graph display data for $F(X)=2x+4$ is preset overlapping current data in buffer 6A. Thus, the graphs for $F(X)=X^2$ and $F(X)=2X+4$ are simultaneously displayed on section 8.

Graphs to be displayed at section 8 may include graphs of functions such as sinx or tanx preset in an electronic calculator, polygonal or bar graphs based on statistic data, regression curves calculated based on such data, or normal distribution curves. In drawing such graphs, true coordinate data can be calculated directly and plotted approximately. When the graph of a regression curve is drawn, data is sequentially input, converted into graph display data, and displayed at section 8 such that adjacent display points are connected with lines. A regression formula for the regression curve is obtained by calculating constant terms and coefficients and obtaining $Y=AX+B$ in accordance with the regression graph display data.

FIG. 29 is a block diagram according to still another embodiment of the present invention. The reference numerals as in FIG. 18 denote the same parts in FIG. 29, and a detailed description thereof will be omitted. In this embodiment, the electronic calculator uses separate display functions for graphs (pictorial representation) and functional formulas (character representation). With a simple input operation, these two functions can be made to correspond with each other to provide a graph display function which offers visual confirmation. In this embodiment, key input section 1 has switching key 1G for switching between the graph display mode and the text display mode for displaying formulas or equations. Key 1G causes switching between text display buffer 6B and graph display buffer 6A through control section 2. Data storage section 10 has flag register F for storing the mode selected by key 1G, i.e., a graph (G) mode for displaying a graph or a text (T) mode for displaying a formula or equation. Register M 291 and register N 293 store the number of horizontal dots (96 in this embodiment) and the number of vertical dots (64 in this embodiment), respectively.

The mode of operation of this embodiment will be described with reference to the flow charts in FIGS. 30 and 31 and FIGS. 32A and 32B.

Graph key 1D, formula key 1C and function keys 1A are depressed. When data is input in this manner from section 1, section 2 temporarily stores the input data in formula buffer 7. Address designating section 14 designates all address data for a formula or equation for text display, and input data is stored in text display buffer 6B using this address data (step 253). Section 2 sets flag register F in section 10 to indicate TEXT (F=0) (step 255), and transfers ON addresses in buffer 6B to display section 8. Thus, the characters "graph sin X" are displayed, as shown in FIG. 32A (step 257).

A description will be made with reference to FIGS. 32A and 32B for the case wherein a sin function is designated, and its graph and formula (in characters) are displayed.

When "EXE" data is input from section 1, section 2 fetches the sin function from buffer 7, discriminates it, and sends it to operation section 5 (step 259). Section 2 then checks if the input from section 1 indicates the graph or text mode (step 261). If the selected mode is not the graph mode, the flow advances to other designated processing. However, if the graph mode is selected, the sin function for calculating the graph display data is converted into $Y=\sin X$ ($Y=f(X)$) (step 263). The contents of buffer 6B are cleared (step 265), and character display data for functional formula $Y=\sin X$ ($Y=f(X)$) is temporarily stored in buffer 6B (step 267). Section 5 performs graphing operations in accordance with $Y=\sin X$ i ($Y=f(X)$), and temporarily stores all address data for graph display data in buffer 6A (step 269). This sequence is performed in the following manner. First, section 2 calculates (Xmax−Xmin)/M and determines the interval between unit pixels in the X direction. $Y=\sin(X)$ is calculated for $X=X$min, and the value of Y is calculated. The addresses (x, y) of the pixel corresponding to the values (X, Y) are calculated, and the pixel memory location in buffer 6A designated by the addresses (x, y) is activated. Next, the interval between unit pixels in the X direction is added to the above X value, and the obtained X value is used to calculate the value of Y from $Y=\sin(X)$. The addresses (x, y) of the pixel corresponding to the new values (X, Y) are calculated, and the pixel memory location of buffer 6A designated by these addresses is activated. In a similar manner, the unit pixel interval is sequentially added to the value of X, and the addresses (x, y) of the corresponding pixel memories are sequentially activated. Thus, graph calculations for $Y=\sin(X)$ are performed, all the corresponding pixel memories in buffer 6A are activated, and storage processing of display data is completed. Section 2 sets "1" in flag register F (step 271) to set the TEXT mode for displaying characters "Graph sinX" representing the formula or equation. All addresses to be turned on in buffer 6A are transferred to section 8, and the graph is displayed as shown in FIG. 32B (step 273).

Figure 33:
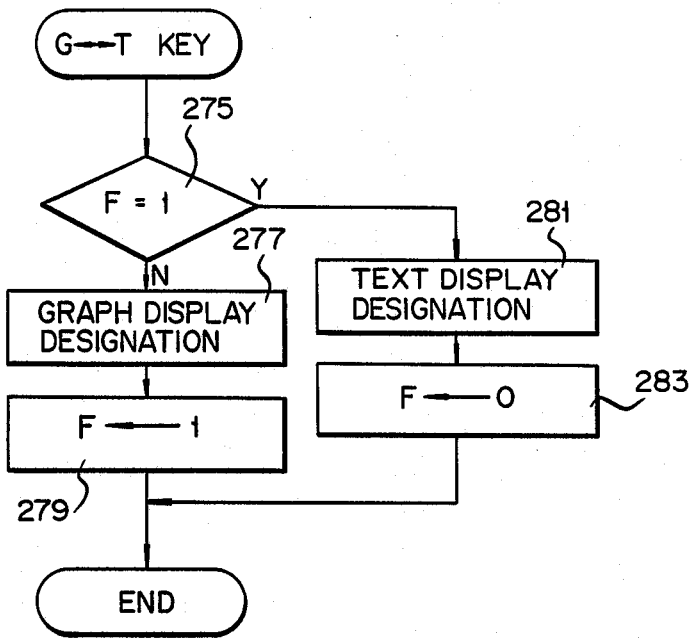
FIG. 33 is a flow chart explaining the function of switch key 1G.
Figure 35:
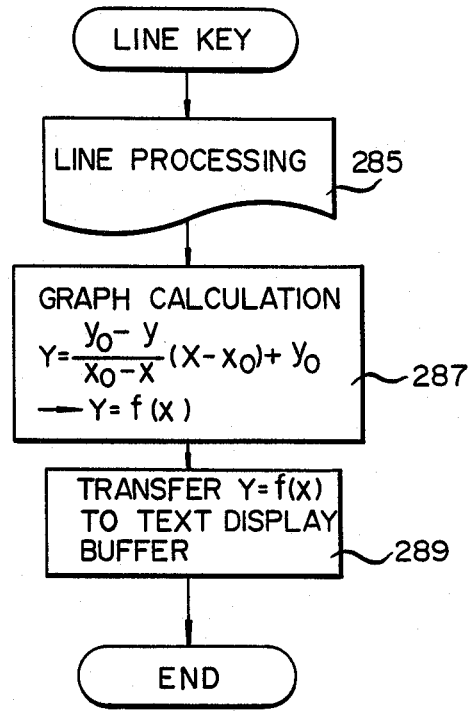
FIG. 35 is a flow chart explaining the effects of depressing a Line key.

A case will be described with reference to the flow charts in FIG. 33 and FIGS. 34A and 34B for a case wherein buffers 6A and 6B are alternately selected in accordance with an instruction from section 2 generated in response to depression of switching key 1G. In the description, it is assumed that a functional formula has already been input. When key 1G is depressed (G⇌T), section 2 checks in step 275 if flag register F represents the graph (F=1) mode or the TEXT mode (F=0). If F=0, the flow advances to step 277. This means that the text mode for section 8 has been selected. Therefore, section 2 transfers all the addresses to be turned on in buffer 6A to section 8 and causes it to display the graph, as shown in FIG. 34B. Next, since the graph is being displayed, register F is set to "1" (step 279). However, if F=1, the flow advances to step 281. Since this means that the graph mode has been selected, all the addresses to be turned on in buffer 6B are transferred to section 8 to allow it to display the characters "Graph Y sinX done" representing the formula or equation. Since the characters are currently displayed on section 8, section 2 sets register F to "0" (step 382). In this manner, the graph and text modes are alternately set immediately after switching key 1G (G⇌T) is depressed.

Figure 36A:
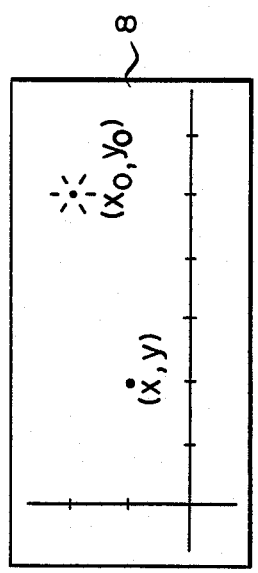
FIGS. 36A through 36C show examples of key operations and graph displays.
Figure 36B:
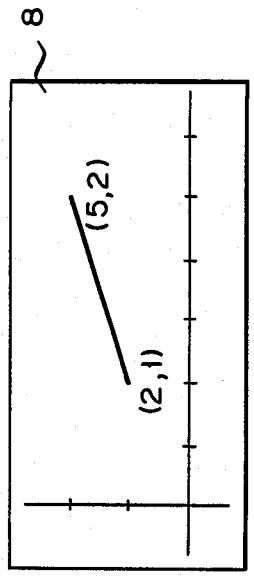
Figure 36C:
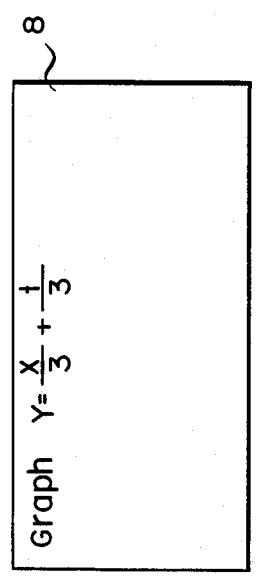

Display examples for other graph data will be described with reference to FIGS. 35 and 36A through 36C. As shown in FIGS. 36A and 36B, two points (2, 1) and (5, 2) on display section 8 are visually designated using the plot key (not shown) in key input section 1. These registers are respectively stored in designated point registers x, y, x0, and y0 of storage section 10. When the Line key (not shown) in section 1 is depressed, the operation for line graph display between the two points (x=2, y=1) and (x0=5, y0=2) is performed, the graph data is stored in buffer 6A, and the contents of buffer 6A are displayed, as shown in FIG. 36B (step 285). Section 5 calculates the formula of a line passing through the two points (step 287), and the formula is stored in buffer 6B as character display data (step 289). When switching key 1G is depressed next, the processing shown in FIG. 33 is performed. Since F=1, buffer 6B is designated and the characters "graph" and "$Y=X/3+\frac{1}{3}$" are immediately displayed as shown in FIG. 36C.

What is claimed is:

1. An electronic calculator having a graphic display function, comprising:
   input means for inputting a functional formula having an independent variable and a dependent variable, and for inputting range data corresponding to values of the independent and the dependent variables of the functional formula;
   functional formula storage means, coupled to said input means, for storing the functional formula;
   range data storage means, coupled to said input means, for storing the range data;
   operation means, coupled to said functional formula storage means and said range data storage means, for sequentially computing the values of the independent and the dependent variables based on the functional formula and the range data, and for obtaining display position data in response to computed values of said variables;
   display means for performing a graph display; and
   display control means, coupled to said operation means and said display means, for controlling said display means to display the graph of the functional formula based on the display position data obtained by said operation means.

2. An electronic calculator according to claim 1, wherein said display means is a dot-matrix type display wherein a plurality of dots are arranged in both row and column directions; and wherein said operation means comprises:
   first computing means for sequentially computing values for the independent variable in correspondence with respective dots arranged in one direction of said display means and based on the range data;
   second computing means for computing a value of the dependent variable for each value of the independent variable computed by said first computing means; and
   third computing means for computing a dot position in another direction of said display means in accordance with the value of the dependent variable computed by said second computing means.

3. An electronic calculator according to claim 2, comprising:
   judging means for judging if two dot positions in said another direction, as computed by said third computing means in correspondence with consecutive dots in said one direction, fall inside a certain display region of said display means; and
   inhibiting means for inhibiting display of a graph on said display means between two points corresponding to the dot positions computed by said third computing means, when said judging means judges that said two dot positions fall outside said certain display region of said display means.

4. An electronic calculator according to claim 1, wherein said operation means includes first arithmetic means for computing positions of coordinate axes for a graph to be displayed by said display means in accordance with the range data, and said display control means controls said display means to display the coordinate axes in response to positions computed by said first arithmetic means, together with said graph.

5. An electronic calculator according to claim 4, wherein said operation means includes second arithmetic means for computing scale mark positions for the displayed graph in accordance with the range data, and said display control means controls said display means to display scales marks in response to the scale mark positions computed by said second arithmetic means, together with the graph and the coordinate axes.

6. An electronic calculator according to claim 5, wherein said operation means includes
   first detecting means for detecting if the positions of the coordinate axes computed by said first arithmetic means fall inside a display region of said display means; and
   first defining means for defining positions of marks to be arranged along an edge of the display region of said display means, when said first detecting means detects that the positions of the coordinate axes fall outside the display region of said display means.

7. An electronic calculator according to claim 5, wherein said operation means includes
   second detecting means for detecting an area of said display region of said display means which region is wider than other areas defined in the display region by the coordinate axes; and
   second defining means for defining positions of marks to be arranged along the wider area side of the coordinate axes.

8. An electronic calculator according to claim 1, further comprising:
   preset-functional-formula storage means for storing preset-functional-formulas;
   fixed range storage means for storing range data of variables of the functional formulas preset in said preset-functional-formula storage means;
   comparing means for detecting a coincidence between functional formulas preset in said preset-functional-formula storage means, and a functional formula input by said input means; and
   means for supplying the range data stored in said fixed range storage means to said operation means, when said comparing means detects a coincidence.

9. An electronic calculator according to claim 1, wherein said display control means comprises storage means for storing display data based on data obtained by said operation means with respect to a plurality of functional formulas.

10. An electronic calculator according to claim 1, wherein said display control means comprises:

graph storage means for storing graph display data based on data obtained by said operation means with respect to the functional formula; and text storage means for storing character display data for a functional formula corresponding to the graph display data;

wherein said input means includes means for inputting a command to select one of said graph storage means and said text storage means, and said display control means controls said display means to display the contents of one of said graph and said text storage means selected in accordance with the command.

* * * * *

UNITED STATES PATENT AND TRADEMARK OFFICE
CERTIFICATE OF CORRECTION

PATENT NO. : 4,794,553
DATED : Dec. 27, 1988
INVENTOR(S) : WATANABE et al

It is certified that error appears in the above-identified patent and that said Letters Patent is hereby corrected as shown below:

Title page, under "U.S. Patent Documents",

"4,701,962" should be -- 4,101,962 --.

Signed and Sealed this

Tenth Day of April, 1990

Attest:

HARRY F. MANBECK, JR.

Attesting Officer

Commissioner of Patents and Trademarks